(12) United States Patent
Furness, III et al.

(10) Patent No.: US 8,888,207 B2
(45) Date of Patent: Nov. 18, 2014

(54) SYSTEMS, METHODS AND ARTICLES RELATED TO MACHINE-READABLE INDICIA AND SYMBOLS

(71) Applicant: Visualant, Inc., Seattle, WA (US)

(72) Inventors: Thomas A. Furness, III, Seattle, WA (US); Brian T. Schowengerdt, Seattle, WA (US)

(73) Assignee: Visualant, Inc., Seattle, WA (US)

( * ) Notice: Subject to any disclaimer, the term of this patent is extended or adjusted under 35 U.S.C. 154(b) by 0 days.

(21) Appl. No.: 13/762,090

(22) Filed: Feb. 7, 2013

(65) Prior Publication Data
US 2013/0215168 A1 Aug. 22, 2013

Related U.S. Application Data

(60) Provisional application No. 61/597,593, filed on Feb. 10, 2012.

(51) Int. Cl.
| | | |
|---|---|---|
| B41J 29/38 | (2006.01) | |
| B41J 2/175 | (2006.01) | |
| B41J 2/205 | (2006.01) | |

(52) U.S. Cl.
CPC ............ *B41J 2/205* (2013.01); *B41J 2/17546* (2013.01)
USPC ........................................................... 347/6

(58) Field of Classification Search
USPC .................... 347/5, 6, 9, 14, 16, 19
See application file for complete search history.

(56) References Cited

U.S. PATENT DOCUMENTS

| | | |
|---|---|---|
| 3,499,158 A | 3/1970 | Lavine et al. |
| 3,504,164 A | 3/1970 | Farrell et al. |

(Continued)

FOREIGN PATENT DOCUMENTS

| | | |
|---|---|---|
| GB | 1 470 737 | 4/1977 |
| JP | 10-508940 A | 9/1998 |

(Continued)

OTHER PUBLICATIONS

"Color Technology Beyond the Visible Spectrum Creating Solutions for Product Authentication: Extraordinary Investment Opportunity & 12 month Roadmap," Visualant Inc., Seattle, Washington, Nov. 17, 2006, 10 pages.

(Continued)

*Primary Examiner* — Kristal Feggins
(74) *Attorney, Agent, or Firm* — Seed IP Law Group PLLC

(57) ABSTRACT

A system employs combinations of marking media, each with respective distinguishing spectral characteristics to encode human comprehensible information in, and read human comprehensible information from, machine-readable indicia or symbols. Machine-readable indicia may be a single dot encoding information only in the combinations. Machine-readable symbols may be linear or two dimensional, spatially encoding information in the combinations, as well as spatially. A symbology may map at least the combinations to human-readable symbols or characters. A printer may form indicia or symbols with combinations of marking media. A reader may read indicia or symbols and decode information from at least the combinations of marking media. Different combinations may be visually homogenous, for example gray.

50 Claims, 9 Drawing Sheets

(56) References Cited

U.S. PATENT DOCUMENTS

| | | | |
|---|---|---|---|
| 3,582,659 A | 6/1971 | Dekker | |
| 3,679,449 A | 7/1972 | Nagot et al. | |
| 3,822,098 A | 7/1974 | Rudder et al. | |
| 3,867,039 A | 2/1975 | Nelson | |
| 3,922,090 A | 11/1975 | Fain | |
| 3,942,185 A | 3/1976 | Lebailly | |
| 3,994,590 A | 11/1976 | Di Martini et al. | |
| 4,082,188 A | 4/1978 | Grimmell et al. | |
| 4,098,940 A | 7/1978 | Groh et al. | |
| 4,120,445 A | 10/1978 | Carrier et al. | |
| 4,183,989 A | 1/1980 | Tooth | |
| 4,241,738 A | 12/1980 | Lübbers et al. | |
| 4,277,514 A | 7/1981 | Sugiura et al. | |
| 4,325,981 A | 4/1982 | Sugiura et al. | |
| 4,531,117 A | 7/1985 | Nourse et al. | |
| 4,652,913 A | 3/1987 | Saitoh et al. | |
| 4,678,338 A | 7/1987 | Kitta et al. | |
| 4,760,250 A | 7/1988 | Loeppert | |
| 4,830,501 A | 5/1989 | Terashita | |
| 4,921,278 A | 5/1990 | Shiang et al. | |
| 4,952,061 A | 8/1990 | Edgar | |
| 5,137,364 A | 8/1992 | McCarthy | |
| 5,304,813 A | 4/1994 | De Man | |
| 5,325,167 A | 6/1994 | Melen | |
| 5,353,052 A * | 10/1994 | Suzuki et al. | 347/19 |
| 5,377,000 A | 12/1994 | Berends | |
| 5,576,627 A | 11/1996 | McEwan | |
| 5,619,326 A | 4/1997 | Takamatsu et al. | |
| 5,844,680 A | 12/1998 | Sperling | |
| 5,926,282 A | 7/1999 | Knobloch et al. | |
| 5,933,244 A | 8/1999 | Kiritchenko | |
| 5,946,006 A * | 8/1999 | Tajika et al. | 347/19 |
| 5,966,217 A | 10/1999 | Roe et al. | |
| 6,020,583 A | 2/2000 | Walowit et al. | |
| 6,035,246 A | 3/2000 | Wagner | |
| 6,038,024 A | 3/2000 | Berner | |
| 6,054,021 A | 4/2000 | Kurrle et al. | |
| 6,142,629 A | 11/2000 | Adel et al. | |
| 6,165,609 A | 12/2000 | Curatolo | |
| 6,172,745 B1 | 1/2001 | Voser et al. | |
| 6,176,522 B1 | 1/2001 | Jackson | |
| 6,255,948 B1 | 7/2001 | Wolpert et al. | |
| 6,384,918 B1 | 5/2002 | Hubble, III et al. | |
| 6,421,553 B1 | 7/2002 | Costa et al. | |
| 6,437,326 B1 | 8/2002 | Yamate et al. | |
| 6,439,688 B1 | 8/2002 | Vives et al. | |
| 6,449,045 B1 | 9/2002 | Mestha | |
| 6,494,557 B1 * | 12/2002 | Kato et al. | 347/19 |
| 6,556,932 B1 | 4/2003 | Mestha et al. | |
| 6,560,352 B2 | 5/2003 | Rowe et al. | |
| 6,560,546 B1 | 5/2003 | Shenk et al. | |
| 6,584,435 B2 | 6/2003 | Mestha et al. | |
| 6,621,576 B2 | 9/2003 | Tandon et al. | |
| 6,633,382 B2 | 10/2003 | Hubble, III et al. | |
| 6,639,699 B2 | 10/2003 | Matsuyama | |
| 6,690,465 B2 | 2/2004 | Shimizu et al. | |
| 6,718,046 B2 | 4/2004 | Reed et al. | |
| 6,721,440 B2 | 4/2004 | Reed et al. | |
| 6,721,629 B2 | 4/2004 | Wendling et al. | |
| 6,724,912 B1 | 4/2004 | Carr et al. | |
| 6,731,785 B1 | 5/2004 | Mennie et al. | |
| 6,744,909 B1 | 6/2004 | Kostrzewski et al. | |
| 6,748,533 B1 | 6/2004 | Wu et al. | |
| 6,757,406 B2 | 6/2004 | Rhoads | |
| 6,763,124 B2 | 7/2004 | Alattar et al. | |
| 6,765,663 B2 | 7/2004 | Byren et al. | |
| 6,782,115 B2 | 8/2004 | Decker et al. | |
| 6,788,800 B1 | 9/2004 | Carr et al. | |
| 6,798,517 B2 | 9/2004 | Wagner et al. | |
| 6,804,376 B2 | 10/2004 | Rhoads et al. | |
| 6,804,377 B2 | 10/2004 | Reed et al. | |
| 6,809,855 B2 | 10/2004 | Hubble, III et al. | |
| 6,819,775 B2 | 11/2004 | Amidror et al. | |
| 6,832,003 B2 | 12/2004 | McGrew | |
| 6,870,620 B2 | 3/2005 | Faupel et al. | |
| 6,882,737 B2 | 4/2005 | Lofgren et al. | |
| 6,888,633 B2 | 5/2005 | Vander Jagt et al. | |
| 6,930,773 B2 | 8/2005 | Cronin et al. | |
| 6,937,323 B2 | 8/2005 | Worthington et al. | |
| 6,968,337 B2 | 11/2005 | Wold | |
| 6,980,704 B2 | 12/2005 | Kia et al. | |
| 6,992,775 B2 | 1/2006 | Soliz et al. | |
| 6,993,535 B2 | 1/2006 | Bolle et al. | |
| 6,995,839 B1 | 2/2006 | Shapiro | |
| 6,996,478 B2 | 2/2006 | Sunshine et al. | |
| 7,001,038 B2 | 2/2006 | Bock et al. | |
| 7,003,132 B2 | 2/2006 | Rhoads | |
| 7,003,141 B1 | 2/2006 | Lichtermann et al. | |
| 7,005,661 B2 | 2/2006 | Yamaguchi et al. | |
| 7,006,204 B2 | 2/2006 | Coombs et al. | |
| 7,008,795 B2 | 3/2006 | Yerazunis et al. | |
| 7,012,695 B2 | 3/2006 | Maier et al. | |
| 7,016,717 B2 | 3/2006 | Demos et al. | |
| 7,018,204 B2 | 3/2006 | Jung et al. | |
| 7,023,545 B2 | 4/2006 | Slater | |
| 7,026,600 B2 | 4/2006 | Jamieson et al. | |
| 7,027,134 B1 | 4/2006 | Garcia-Rubio et al. | |
| 7,027,165 B2 | 4/2006 | De Haas et al. | |
| 7,027,619 B2 | 4/2006 | Pavlidis et al. | |
| 7,031,555 B2 | 4/2006 | Troyanker | |
| 7,032,988 B2 | 4/2006 | Darby et al. | |
| 7,035,873 B2 | 4/2006 | Weare | |
| 7,038,766 B2 | 5/2006 | Kerns et al. | |
| 7,041,362 B2 | 5/2006 | Barbera-Guillem | |
| 7,044,386 B2 | 5/2006 | Berson | |
| 7,046,346 B2 | 5/2006 | Premjeyanth et al. | |
| 7,046,842 B2 | 5/2006 | Lin et al. | |
| 7,049,597 B2 | 5/2006 | Bodkin | |
| 7,052,730 B2 | 5/2006 | Patel et al. | |
| 7,052,920 B2 | 5/2006 | Ushio et al. | |
| 7,058,200 B2 | 6/2006 | Donescu et al. | |
| 7,058,530 B1 | 6/2006 | Miller et al. | |
| 7,061,652 B2 | 6/2006 | Kurita et al. | |
| 7,063,260 B2 | 6/2006 | Mossberg et al. | |
| 7,130,444 B2 | 10/2006 | Housinger et al. | |
| 7,155,068 B2 | 12/2006 | Zhang et al. | |
| 7,170,606 B2 | 1/2007 | Yerazunis | |
| 7,171,680 B2 | 1/2007 | Lange | |
| 7,252,241 B2 | 8/2007 | Yamada | |
| 7,259,853 B2 | 8/2007 | Hubble, III et al. | |
| 7,285,158 B2 | 10/2007 | Iwanami et al. | |
| 7,307,752 B1 | 12/2007 | Mestha et al. | |
| 7,313,427 B2 | 12/2007 | Benni | |
| 7,317,814 B2 | 1/2008 | Kostrzewski et al. | |
| 7,319,775 B2 | 1/2008 | Sharma et al. | |
| 7,383,261 B2 | 6/2008 | Mestha et al. | |
| 7,406,184 B2 | 7/2008 | Wolff et al. | |
| 7,440,620 B1 | 10/2008 | Aartsen | |
| 7,474,407 B2 | 1/2009 | Gutin | |
| 7,483,548 B2 | 1/2009 | Nakano et al. | |
| 7,570,988 B2 | 8/2009 | Ramanujam et al. | |
| 7,733,490 B2 | 6/2010 | Goodwin et al. | |
| 7,996,173 B2 | 8/2011 | Schowengerdt et al. | |
| 8,064,286 B2 | 11/2011 | Rønnekleiv et al. | |
| 8,076,630 B2 | 12/2011 | Schowengerdt et al. | |
| 8,081,304 B2 | 12/2011 | Furness, III et al. | |
| 8,285,510 B2 | 10/2012 | Schowengerdt | |
| 8,368,878 B2 | 2/2013 | Furness, III et al. | |
| 8,542,418 B2 * | 9/2013 | Chandu et al. | 347/19 |
| 2002/0146146 A1 | 10/2002 | Miolla et al. | |
| 2003/0031347 A1 | 2/2003 | Wang | |
| 2003/0045798 A1 | 3/2003 | Hular et al. | |
| 2003/0063772 A1 | 4/2003 | Smith et al. | |
| 2003/0151611 A1 | 8/2003 | Turpin et al. | |
| 2003/0156752 A1 | 8/2003 | Turpin et al. | |
| 2003/0158617 A1 | 8/2003 | Turpin et al. | |
| 2003/0158788 A1 | 8/2003 | Turpin et al. | |
| 2003/0174882 A1 | 9/2003 | Turpin et al. | |
| 2004/0071311 A1 | 4/2004 | Choi et al. | |
| 2004/0101158 A1 | 5/2004 | Butler | |
| 2004/0101159 A1 | 5/2004 | Butler | |
| 2006/0059013 A1 | 3/2006 | Lowe | |
| 2006/0161788 A1 | 7/2006 | Turpin et al. | |
| 2007/0078610 A1 | 4/2007 | Adams et al. | |

(56) References Cited

U.S. PATENT DOCUMENTS

| | | |
|---|---|---|
| 2008/0171925 A1 | 7/2008 | Xu et al. |
| 2008/0252066 A1 | 10/2008 | Rapoport et al. |
| 2011/0223655 A1 | 9/2011 | Lapota et al. |
| 2012/0072176 A1 | 3/2012 | Schowengerdt et al. |
| 2013/0024151 A1 | 1/2013 | Schowengerdt et al. |
| 2013/0208260 A1 | 8/2013 | Furness, III et al. |
| 2014/0063239 A1 | 3/2014 | Furness, III et al. |

FOREIGN PATENT DOCUMENTS

| | | |
|---|---|---|
| JP | 2005-214835 A | 8/2005 |
| WO | 91/05459 A1 | 5/1991 |
| WO | 00/12229 A1 | 3/2000 |
| WO | 03/069884 A2 | 8/2003 |
| WO | 2004/089640 A2 | 10/2004 |
| WO | 2006/050367 A2 | 5/2006 |
| WO | 2008/016590 A2 | 2/2008 |
| WO | 2013/043737 A1 | 3/2013 |
| WO | 2013/119822 A1 | 8/2013 |
| WO | 2013/119824 A1 | 8/2013 |

OTHER PUBLICATIONS

Cri Nuance Multispectral Imaging System, URL=http://www.cri-inc.com/products/nuance.asp, download date Jan. 30, 2007, 2 pages.
Cri Products Components, URL=http://www.cri-inc.com/products/components.asp, download date Jan. 30, 2007, 5 pages.
Furness III, "Systems, Methods and Articles Related to Machine-Readable Indicia and Symbols," U.S. Appl. No. 61/597,593, filed Feb. 10, 2012, 89 pages.
Furness III, "Area Surveillance Systems and Methods," U.S. Appl. No. 61/597,586, filed Feb. 10, 2012, 72 pages.
Furness, III et al, "Area Surveillance Systems and Methods," U.S. Appl. No. 13/762,095, filed Feb. 7, 2013, 72 pages.
Furness, III et al., "Method, Apparatus, and Article to Facilitate Evaluation of Objects Using Electromagnetic Energy," U.S. Appl. No. 60/871,639, filed Dec. 22, 2006, 140 pages.
Furness, III et al., "Method, Apparatus, and Article to Facilitate Evaluation of Objects Using Electromagnetic Energy," U.S. Appl. No. 60/883,312, filed Jan. 3, 2007, 147 pages.
Furness, III et al., "Method, Apparatus, and Article to Facilitate Evaluation of Objects Using Electromagnetic Energy," U.S. Appl. No. 60/890,446, filed Feb. 16, 2007, 155 pages.
Furness, III et al., "Methods, Apparatus, and Article to Facilitate Evaluation of Objects Using Electromagnetic Energy," U.S. Appl. No. 60/834,589, filed Jul. 31, 2006, 135 pages.
International Search Report, mailed Jul. 23, 2008, for PCT/US2007/017082, 1 page.
International Search Report, mailed Jun. 21, 2007, for PCT/US2005/039495, 1 page.
International Search Report, mailed Feb. 25, 2013, for PCT/US2012/056135, 3 pages.
International Search Report, mailed May 15, 2013, for PCT/US2013/025162, 3 pages.
International Search Report, mailed May 13, 2013, for PCT/US2013/025164, 3 pages.
Japanese Office Action with English Translation for Corresponding Japanese Patent Application No. 2009-522834, mailed Aug. 7, 2012, 8 pages.
Mander et al., "A Device for Evaluation of Fluids Using Electromagnetic Energy," U.S. Appl. No. 13/797,737, filed Mar. 12, 2013, 61 pages.
Mander et al., "A Device for Evaluation of Fluids Using Electromagnetic Energy," U.S. Appl. No. 61/767,716, filed Feb. 21, 2013, 61 pages.
Mander et al., "Method, Apparatus, and Article to Facilitate Evaluation of Substances Using Electromagnetic Energy," U.S. Appl. No. 13/796,835, filed Mar. 12, 2013, 74 pages.
Mander et al., "Method, Apparatus, and Article to Facilitate Evaluation of Substances Using Electromagnetic Energy," U.S. Appl. No. 61/760,527, filed Feb. 4, 2013, 72 pages.
Mander et al., "Systems and Methods for Fluid Analysis Using Electromagnetic Energy," U.S. Appl. No. 61/777,750, filed Mar. 12, 2013, 39 pages.
Mander et al., "Systems and Methods for Fluid Analysis Using Electromagnetic Energy," U.S. Appl. No. 14/206,055, filed Mar. 12, 2014, 39 pages.
Purdy, "Fluid Medium Sensor System and Method," U.S. Appl. No. 61/538,617, filed Sep. 23, 2011, 75 pages.
Purdy et al., "Fluid Medium Sensor System and Method," U.S. Appl. No. 14/223,716, filed Mar. 24, 2014, 75 pages.
Schowengerdt et al., "Method, Apparatus, and Article to Facilitate Distributed Evaluation of Objects Using Electromagnetic Energy," U.S. Appl. No. 60/834,662, filed Jul. 31, 2006, 96 pages.
Schowengerdt et al., "System and Method of Evaluating an Object Using Electromagnetic Energy," U.S. Appl. No. 60/820,938, filed Jul. 31, 2006, 69 pages.
Schowengerdt, "Brief Technical Description of the Cyclops Spectral Analysis and Authentication System," Visualant Inc. memorandum, not disclosed prior to Dec. 22, 2006, 2 pages.
Thomas, "A Beginner's Guide to ICP-MS—Part V: The Ion Focusing System," *Spectroscopy 16*(9):38-44, Sep. 2001.
Turpin et al., "Full Color Spectrum Object Authentication Methods and Systems," U.S. Appl. No. 60/732,163, filed Oct. 31, 2005, 198 pages.
Turpin, "Full Color Spectrum Object Authentication Methods and Systems," U.S. Appl. No. 60/623,881, filed Nov. 1, 2004, 114 pages.
Vrhel, "An LED based spectrophotometric instrument," *Color Imaging: Device-Independent Color, Color Hardcopy, and Graphic Arts IV, Proceedings of the SPIE 3648*:226-236, Jan. 1999.
Written Opinion, mailed Jul. 23, 2008, for PCT/US2007/017082, 3 pages.
Written Opinion, mailed Jun. 21, 2007, for PCT/US2005/039495, 5 pages.
Written Opinion, mailed Feb. 25, 2013, for PCT/US2012/056135, 4 pages.
Written Opinion, mailed May 15, 2013, for PCT/US2013/025162, 7 pages.
Written Opinion, mailed May 13, 2013, for PCT/US2013/025164, 6 pages.

\* cited by examiner

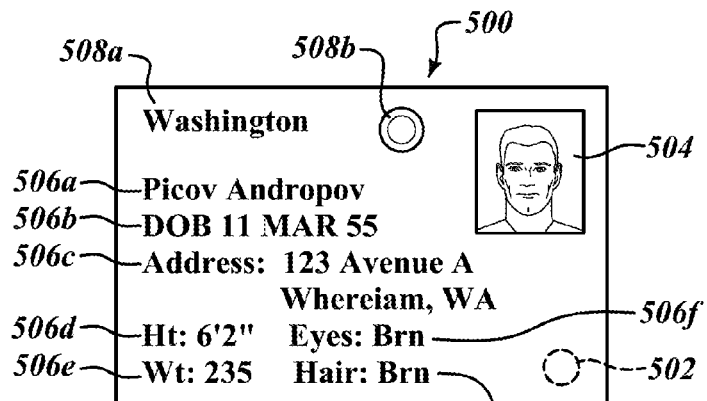
FIG. 5
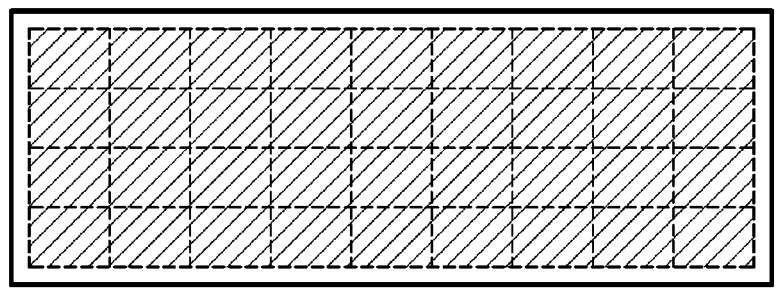
FIG. 6A
FIG. 6B

SYSTEMS, METHODS AND ARTICLES RELATED TO MACHINE-READABLE INDICIA AND SYMBOLS

BACKGROUND

1. Technical Field

This disclosure relates to machine-readable indicia and symbols which encode information therein, and to printers to print machine-readable indicia and symbols and readers to read machine-readable indicia and symbols.

2. Description of the Related Art

Machine-readable symbols are ubiquitous, used on labels applied to various goods in stores, and used on objects such as equipment, pallets and even railcars. Machine-readable symbols provide an inexpensive way to encode information, typically about the good or object, in a form that is easy to extract using automatic data collection devices such as machine-readable symbol readers (i.e., imagers, scanners). Machine-readable symbol readers are commonly referred to as scanners or barcode scanners, without regard to whether such take the form of imager employing ambient light or flood illumination or scanners which typically employ a photodiode or the like and a narrow scanning beam of illumination such as a laser.

Machine-readable symbols are typically formed of a number of symbol characters, which are selected from a symbology. Each symbol character is defined by a set of marks (e.g., bars and spaces). A symbology defines a mapping between symbol characters and human-readable or human-comprehensible symbols, for instance alphanumeric characters (e.g., full ASCII set) or characters from non-English alphabets (e.g., Greek, Cyrillic, Chinese, Kanji). The symbology may even define a mapping between certain symbol characters and commands or operations (e.g., shift, start, stop). There are a large number of existing symbologies, for example Universal Product Code (UPC)/European Article Number (EAN), Code 39, Code 128, Code 93i, Codabar, EAN/JAN-13, PDF 417, DataMatrix Code, MaxiCode.

Machine-readable symbols take a variety of forms. For example, the most common type of machine-readable symbols are one dimensional or linear machine-readable symbols, commonly referred to as barcode symbols. Linear machine-readable symbols are typically formed of combinations of bars and spaces, although any to contrasting colors may be employed. Early linear symbols employed a binary symbology, for instance binary coded decimal. Newer linear symbologies achieve higher density (i.e., amount of encoded information per unit area) typically by encoding information in the relative distances between leading edges and/or trailing edges of successive bars and/or spaces.

Also for example, two dimensional symbols such as area or matrix machine-readable symbols or stacked machine-readable symbols are becoming increasingly more common due to their higher information encoding density relative to linear machine-readable symbols. Area or matrix machine-readable symbols typically employ two dimensional arrays of marks (e.g., hexagons) where information is encoded in the pattern of the marks. Stacked code machine-readable symbols typically employ multiple rows of linear machine-readable symbols, the increase in density resulting from reducing the space that would otherwise be required between separate linear machine-readable symbols.

Efforts to further increase information density include attempts to define and use multi-color symbologies. Such attempts employ three or more colors to encode information. The result of a recent attempt is the high capacity color barcode technology developed by Microsoft Corporation. Such employs either a 4 color palette or an 8 color pallet to form two dimension machine-readable symbols. Each symbol is composed of an array of rows and columns. Each cell of the array is divided diagonally, and each portion of the cell is a respective color selected from the particular palette of colors to encode information.

While typically not readable by the average human, the marks which form a machine-readable symbol are typically visually perceptible by humans. For example, humans will see a pattern of dark bars and white or light spaces, but will not likely be capable of discerning the information encoded in the pattern of marks. Such is true whether the machine-readable symbols are encoded using a standard two color symbology (e.g., black bars, white or light spaces) or using a multi-color symbology.

New approaches to producing and/or reading machine-readable symbols, particularly high density machine-readable symbols are desirable to allow automatic encoding and collection of information.

BRIEF SUMMARY

It may be useful to produce and/or read machine-readable indicia or symbols with using a relatively large number of machine recognizable spectrally distinct marks. Such may employ a set of spectrally distinct marks formed from combinations of marking media such as inks or toners, which each marking media has a respective distinct spectral characteristic, signature or profile. Combinations of a set of marking media may generate a much larger set of distinct spectral characteristics, signatures or profiles. For example, a first marking media may have a distinct response at or about a first wavelength, while a second marking media may have a distinctive response at or about a second wavelength. Each marking media is machine recognizable based on the distinctive response, and a combination of the first and the second marking media is machine recognizable or distinguishable based on its respective distinctive response (i.e., distinctive response at or about both the first and the second wavelengths). The total number of combinations increases quickly as the number of distinct marking media available to form a machine-readable symbol increases. Such may be useful in producing and/or reading indicia consisting of single, individual, marks which encode a somewhat limited amount of information. Such may be useful in producing and/or reading symbols composed of sets of marks which encode a larger amount of information.

It may be useful to produce and/or read machine-readable symbols with using a relatively large number of machine recognizable spectrally distinct marks which marks are not effectively visually distinguishable by humans without the aid of a device or special equipment. Such may, for instance reduce the occurrence of counterfeiting. Such may, for instance, visually obscure the machine-readable indicia or symbol or render such a homogenous area or region as perceived by a human. For example, two instances of a single mark encoding different pieces of information may not be visually discernable from one another. Also for example, a set of marks constituting a machine-readable symbol may be formed from respective combinations of two or more marking media, and the set of marks forming the machine-readable symbol may have a relatively uniform color (e.g., gray) as perceived by a human. Yet, each mark may be distinctly distinguishable from one another by a reader such as an imager or scanner type reader.

A printer may be summarized as including a number of media receptacles to respectively receive respective ones of a number of consumable marking media, each of the marking media having at least one respective spectral distinguishing characteristic, the at least one spectral distinguishing characteristic of each one of the marking media different from the at least one spectral distinguishing characteristic of the other ones of the marking media; at least one printhead operable to selectively form one or more marks with the marking media on a substrate media; and a control subsystem which, for each of a number of pieces of information, selects from the number of marking media available in the printer based on the respective piece of information to be represented and controls the at least one printhead to form the marks on the substrate media with the marking media selected for the respective one of the pieces of information, at least one of the marks including a combination of at least two of the marking media which are not spatially separably distinguishable from one another by an unaided human.

The printer may further include at least one combining chamber in which the selected marking media are combined before forming the marks on the substrate media. The control subsystem may control the printhead to apply a first one of the selected marking media to a first area of the substrate media, and subsequently apply a second one of the selected marking media to the first area of the substrate media. The printer may be an ink jet printer and the marking media may include a plurality of inks or may be a laser printer and the marking media may include a plurality of toners. The control subsystem may further, for each of at least some of the number of pieces of information to be represented on one or more substrate media, selects from the number of consumable marking media available in the printer at least one additional marking media that in combination with the other selected marking media masks the marks. The control subsystem may further, for each of at least some of the number of pieces of information to be represented on one or more substrate media, selects from the number of consumable marking media available in the printer at least one additional marking media that in combination with the other selected marking media for the respective mark renders the respective mark effectively not visually humanly discernable from other ones of the marks by an unaided human observer.

The printer may further include a transport mechanism communicatively coupled to the control subsystem to be controlled thereby and operable to transport the substrate medium relative to the printhead. The transport mechanism may be one of a sheet feed transport mechanism including at least one roller and at least one motor coupled to drive the at least one roller and operable to transport sheets of substrate medium past the printhead or a continuous web transport mechanism including at least one roller and at least one motor coupled to drive the continuous web of substrate medium past the printhead.

A method of operating a printer may be summarized as including for each of a number of pieces of information to be represented on one or more substrate media, selecting from a number of consumable marking media available in the printer based on the respective piece of information to be represented, each of the marking media having at least one respective spectral distinguishing characteristic, the at least one spectral distinguishing characteristic of each one of the marking media different from the at least one spectral distinguishing characteristic of the other ones of the marking media; and for each of a number of pieces of information to be represented on one or more substrate media, forming a mark on the substrate media with the marking media selected for the respective one of the pieces of information, at least one of the marks including a combination of at least two of the marking media which are not spatially separably distinguishable from one another by an unaided human.

The method of operating a printer may further include combining the selected marking media before forming the mark on the substrate media. Forming a mark on the substrate media with the marking media selected for the respective one of the pieces of information may include applying a first one of the selected marking media to a first area of the substrate media, and subsequently applying a second one of the selected marking media to the first area of the substrate media. Forming the mark on the substrate media may include at least one of ejecting or depositing the selected marking media on the substrate media. The number of marking media may take the form of a plurality of ink or a plurality of toners, and forming the mark on the substrate media may include applying to the substrate media the inks or the toners that correspond to the selected marking media.

The method of operating a printer may further include for each of at least some of the number of pieces of information to be represented on one or more substrate media, selecting from the number of consumable marking media available in the printer at least one additional marking media that in combination with the other selected marking media masks the mark.

The method of operating a printer may further include for each of at least some of the number of pieces of information to be represented on one or more substrate media, selecting from the number of consumable marking media available in the printer at least one additional marking media that in combination with the other selected marking media for the respective mark renders the respective mark effectively not visually discernable from other ones of the marks by an unaided human observer.

A printer may be summarized as including a number of media receptacles to respectively receive respective ones of a number of consumable marking media, each of the marking media having at least one respective spectral distinguishing characteristic, the at least one spectral distinguishing characteristic of each one of the marking media different from the at least one spectral distinguishing characteristic of the other ones of the marking media; at least one combining chamber in which the selected marking media are combined; at least one printhead operable to selectively form one or more marks with the combined marking media on a substrate media; and a control subsystem which, for each of a number of pieces of information, selects from the number of marking media available in the printer based on the respective piece of information to be represented and controls the at least one printhead to form the marks on the substrate media with the combined marking media selected for the respective one of the pieces of information, at least one of the marks including a combination of at least two of the marking media which are not spatially separably distinguishable from one another by an unaided human.

A first number of the marking media may be combined for a first one of the pieces of information, and a second number of the marking media may be combined for a second one of the pieces of information, the second number different than the first number. For each of at least some of the number of pieces of information to be represented on one or more substrate media, the control subsystem may further select from the number of consumable marking media available in the printer at least one additional marking media that in combination with the other selected marking media masks the mark. For each of at least some of the number of pieces of information to be represented on one or more substrate media, the control subsystem may further select from the number of consumable marking media available in the printer at least one additional marking media that in combination with the other selected marking media for the respective mark renders the respective mark effectively not visually discernable from other ones of the marks by an unaided human observer.

A method of operating a printer may be summarized as including for each of a number of pieces of information to be represented on one or more substrate media, selecting from a number of consumable marking media available in the printer based on the respective piece of information to be represented, each of the marking media having at least one respective spectral distinguishing characteristic, the at least one spectral distinguishing characteristic of each one of the marking media different from the at least one spectral distinguishing characteristic of the other ones of the marking media; for at least one of the pieces of information, combining a combination of at least two of the marking media selected for the respective one of the pieces of information; and for each of a number of pieces of information to be represented on one or more substrate media, forming a mark on the substrate media with the marking media selected for the respective one of the pieces of information.

Mixing a combination of at least two of the marking media selected for the respective one of the pieces of information may include combining a combination of two of the marking media for a first one of the pieces of information, and combining a combination of five of the marking media for a second one of the pieces of information.

The method of operating a printer may further include for each of at least some of the number of pieces of information to be represented on one or more substrate media, selecting from the number of consumable marking media available in the printer at least one additional marking media that in combination with the other selected marking media masks the mark.

The method of operating a printer may further include for each of at least some of the number of pieces of information to be represented on one or more substrate media, selecting from the number of consumable marking media available in the printer at least one additional marking media that in combination with the other selected marking media for the respective mark renders the respective mark effectively not visually discernable from other ones of the marks by an unaided human observer.

A printer may be summarized as including a number of media receptacles to respectively receive respective ones of a number of consumable marking media, each of the marking media having at least one respective spectral distinguishing characteristic, the at least one spectral distinguishing characteristic of each one of the marking media different from the at least one spectral distinguishing characteristic of the other ones of the marking media; at least one printhead operable to selectively form one or more marks with the marking media on a substrate media; and a control subsystem which, for each of a number of pieces of information to be represented on one or more substrate media, selects from the consumable marking media available in the printer based on the respective piece of information to be represented, and selects from the number of consumable marking media available in the printer at least one additional marking media that in combination with the other selected marking media for the respective mark renders the respective mark effectively not visually discernable from other ones of the marks by an unaided human observer.

The printer may further include a combining chamber in which the marking media selected for the respective one of the pieces of information and the additional marking media selected for the respective one of the pieces of information are combined; and wherein, for each of the number of pieces of information to be represented on one or more substrate media, the control subsystem controls the at least one printhead to form a respective mark on the substrate media with the combination of marking media and additional marking media selected for the respective one of the pieces of information. Combining the marking media selected for the respective one of the pieces of information and the additional marking media may include combining at least two of the marking media selected for a first one of the pieces of information and at least one of the additional marking media selected for the respective first one of the pieces of information. Selecting from the number of consumable marking media available in the printer at least one additional marking media may include selecting the additional marking media to produce a respective combination of marking media that results in markings which are effectively humanly visually indiscernible in color for each different piece of information. Selecting from the number of consumable marking media available in the printer at least one additional marking media may include selecting the additional marking media to produce a respective combination of marking media that results in markings which are gray in color for each different piece of information.

A method of operating a printer may be summarized as including, for each of a number of pieces of information to be represented on one or more substrate media, selecting from a number of consumable marking media available in the printer based on the respective piece of information to be represented, each of the marking media having at least one respective spectral distinguishing characteristic, the at least one spectral distinguishing characteristic of each one of the marking media different from the at least one spectral distinguishing characteristic of the other ones of the marking media; for each of at least some of the number of pieces of information to be represented on one or more substrate media, selecting from the number of consumable marking media available in the printer at least one additional marking media that in combination with the other selected marking media for the respective mark renders the respective mark effectively not visually discernable from other ones of the marks by an unaided human observer.

The method of operating a printer may further include combining the marking media selected for the respective one of the pieces of information and the additional marking media selected for the respective one of the pieces of information; and for each of a number of pieces of information to be represented on one or more substrate media, forming a mark on the substrate media with the combination of marking media selected for the respective one of the pieces of information. Combining the marking media selected for the respective one of the pieces of information and the additional marking media may include combining at least two of the marking media selected for a first one of the pieces of information and at least one of the additional marking media selected for the respective first one of the pieces of information. The control subsystem may select the additional marking media to produce a respective combination of marking media that results in markings which are effectively humanly visually indiscernible in color for each different piece of information. The control subsystem may select the additional marking media to produce a respective combination of marking media that results in markings which are gray in color for each different piece of information.

A printer may be summarized as including at least one printhead operable to selectively form one or more marks with the marking media on a substrate media; and a control subsystem which causes the at least one printhead to form a first symbol character of a symbol at a first region of a piece of substrate media; and at least a second symbol character of the symbol at a second region of the piece of substrate media, the second region spatially distinct from the first region, wherein the second symbol character at the second region is effectively humanly visually indiscernible in color from the first symbol character at the first region.

The control subsystem may further cause the at least one printhead to form at least a third symbol character of the symbol at a third region of the piece of substrate media, the third region spatially distinct from the first and the second regions, wherein the third symbol character at the third region is effectively humanly visually indiscernible in color from the first and the second symbol characters at the first and the second regions, respectively.

The printer may further include a number of reservoirs of marking media available to the at least one printhead, each of the marking media having at least one respective spectral distinguishing characteristic, the at least one spectral distinguishing characteristic of each one of the marking media different from the at least one spectral distinguishing characteristic of the other ones of the marking media. The control subsystem may cause the at least one printhead to form the first symbol character of the symbol from a first combination of at least two of a plurality of marking media based on the information to be represented; and form the second symbol character of the symbol from a second combination of at least two of a plurality of marking media based on the information to be represented, the second combination different from the first combination.

The printer may further include at least one combining chamber in which the selected marking media are combined before forming the marks on the substrate media. The control subsystem may cause the at least one printhead to apply a first one of the marking media of the first combination to a first region of the substrate media, and subsequently apply a second one of the marking media of the first combination to the first region of the substrate media to form the first symbol character on the substrate media. For each of a plurality of symbol characters of the symbol, including the first and the second symbol characters, the control subsystem may determine both a respective relative position and a respective combination of marking media for the symbol character based on the information to be encoded in the symbol where information is at least partially encoded in the relative position and the combination of marking media of the symbol characters. For each of a plurality of symbol characters of the symbol, including the first and the second symbol characters, the control subsystem may determine a neutralizing marking media that when combined with other marking media will result in a humanly perceptible color that renders the respective symbol character effectively humanly visually indiscernible in color from all other symbol characters which form the symbol. The printer may be an ink jet printer and the marking media may include a plurality of inks or the printer may be a laser printer and the marking media may include a plurality of toners.

A method of operating a printer to form symbols which encode information may be summarized as including forming a first symbol character of a symbol at a first region of a piece of substrate media; and forming at least a second symbol character of the symbol at a second region of the piece of substrate media, the second region spatially distinct from the first region, wherein the second symbol character at the second region is effectively humanly visually indiscernible in color from the first symbol character at the first region.

The method of operating a printer to form symbols which encode information may further include forming at least a third symbol character of the symbol at a third region of the piece of substrate media, the third region spatially distinct from the first and the second regions, wherein the third symbol character at the third region is effectively humanly visually indiscernible in color from the first and the second symbol characters at the first and the second regions, respectively. Forming a first symbol character may include forming the first symbol character of the symbol from a first combination of at least two of a plurality of marking media available in the printer based on the information to be represented, each of the marking media having at least one respective spectral distinguishing characteristic, the at least one spectral distinguishing characteristic of each one of the marking media different from the at least one spectral distinguishing characteristic of the other ones of the marking media; and wherein forming a second symbol character may include forming the second symbol character of the symbol from a second combination of at least two of a plurality of marking media available in the printer based on the information to be represented, the second combination different from the first combination. Forming the first and the second symbol characters on the substrate media may include at least one of ejecting or depositing the respective combination of marking media on the substrate media.

The method of operating a printer to form symbols which encode information may further include mixing the marking media of the first combination before forming the first symbol character on the substrate media. Forming a first symbol character on the substrate media with the first combination of marking media may include applying a first one of the marking media of the first combination to a first region of the substrate media, and subsequently applying a second one of the marking media of the first combination to the first region of the substrate media.

The method of operating a printer to form symbols which encode information may further include, for each of a plurality of symbol characters of the symbol, including the first and the second symbol characters, determining both a respective relative position and a respective combination of marking media for the symbol character based on the information to be encoded in the symbol where information is at least partially encoded in the relative position and the combination of marking media of the symbol characters. Determining a respective combination of marking media for the symbol character based on the information to be encoded in the symbol may include determining a neutralizing marking media that when combined with other marking media will result in a humanly perceptible color that renders the respective symbol character effectively humanly visually indiscernible in color from all other symbol characters which form the symbol.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn, are not intended to convey any information regarding the actual shape of the particular elements, and have been solely selected for ease of recognition in the drawings.

FIG. 5 is a plan view of a piece of identification, according to one illustrated embodiment, which includes a machine-readable indicia formed of a combination of marking media.

FIG. 6A is a plan view of a machine-readable symbol formed with various combinations of marking media, according to one illustrated embodiment, graphically illustrating various combinations of six marking media which may be used to encode information in the machine-readable symbol.

FIG. 6B is a plan view of the machine-readable symbol of FIG. 6A illustrating how such is visually perceived by a human with aid of any apparatus or article to detect distinct spectral characteristics of the various combinations of marking media.

DETAILED DESCRIPTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with wireless communications, position determination, power production including rectification, conversion and/or conditioning, have not been shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense, that is as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

The headings and Abstract of the Disclosure provided herein are for convenience only and do not interpret the scope or meaning of the embodiments.

Figure 1:
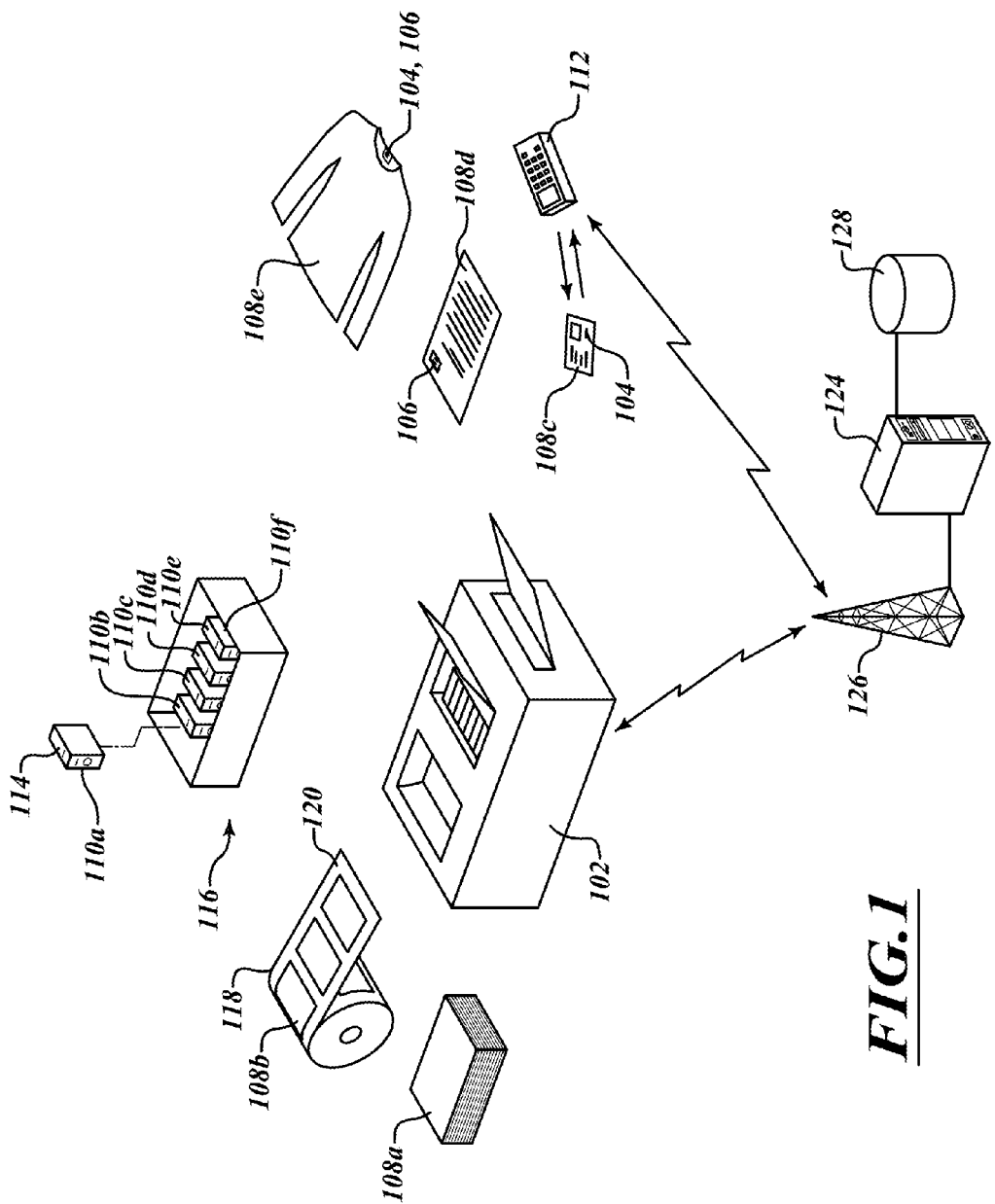
FIG. 1 is an isometric view of an environment including a printer, substrate media and a kit of marking media for use by the printer in forming machine-readable indicia or symbols on various goods or objects, such as identification documents, documents, clothing and labels, and also including a machine-readable symbol reader, the printer and reader communicatively coupled with a host system, according to one illustrated embodiment.

FIG. 1 shows an environment 100 installed in which machine-readable indicia and symbols are formed, read, and/or processed, according to one illustrated embodiment.

One or more printers 102 may form machine-readable indicia 104 and symbols 106 on various types of substrate media 108a-108e (collectively 108), using combinations of various marking media 110a-110f (collectively 110). One or more readers 112 (only one illustrated) may read machine-readable indicia 104 and symbols 106 from various types of substrate media 108.

The marking media 110 may take a variety of forms, for example various inks or toners. Each of the marking media 110 has at least one respective spectrally distinguishing characteristic. For example, a marking medium 110 may have a reflectance peak or spike at or about a particular wavelength in response to some defined wavelength(s) of illumination. Additionally, or alternatively, a marking medium 110 may have a fluorescence peak or spike at or about a particular wavelength in response to some defined wavelength(s) of illumination. Additionally, or alternatively, the marking medium 110 may have an absorption trough at or about a particular wavelength in response to some defined wavelength(s) of illumination. The spectral characteristics or response(s) define a spectral profile or signature of the particular marking medium 110. The marking media 110 are selected such that spectral distinguishing characteristic(s) of each one of the marking media 110 are different from the spectral distinguishing characteristic(s) of the other ones of the marking media 110. The marking media 110 may be packaged in respective separate reservoirs or receptacles 114 (only one called out in FIG. 1). Alternatively, the marking media 110 may be packaged in a common housing. Selected marking media 110 that exhibit different spectral distinguishing characteristic(s) from one another may be advantageously supplied as a kit 116 for use with the printer 102.

The total number of different marking media 110 employed may be determined by the amount of information to be encoded in the indicia or symbol and on whether spatial or other encoding techniques are employed. For example, assuming no spatial or other encoding techniques, six different marking media 110 could represent six states which could be mapped to six respective characters of a human-readable character set of a symbology.

The marking media 110 may be also be combined to produce a variety of additional spectrally distinct responses or signatures. For example, the six different marking media 110 may be combined to produce an additional thirty-six combinations, for a total of forty combinations. Thus, the total number of combinations of six different marking media 110 may be mapped to forty respective characters of a human-readable character set of a symbology with any spatial or other encoding techniques. Such compares favorably to more conventional color barcodes (e.g., high capacity color barcode technology of Microsoft) where each color of a palette (e.g., 4 or 8 colors) are not combined.

As explained below in reference to FIG. 2, the marking media 110 may be combined as part of the depositing, printing or otherwise forming the machine-readable indicia 104 or symbol 106. For example, two more marking media 110 may be sequentially deposited, printed or otherwise formed on the substrate media 108 before the earlier deposited, printed or otherwise formed marking media 110 is dry. Alternatively, the marking media 110 may be combined before being deposited, printed or otherwise formed on the substrate medium 108.

The substrate media 108 may take a large variety of forms. For example, substrate media 108 may take the form of sheet feed media 108a, for instance sheets of paper. Also for example substrate media may take the form of continuous web media 108b, for instance a roll of labels 118 (only one called out) carried on a continuous web of backing or release liner 120. The labels 118 may include a pressure sensitive adhesive, which is selectively releasably from the release liner 120 and may be used to adhere the label 118 to a desired good or object.

As explained in more detail with reference to FIG. 4 below, the reader 112 may illuminate the machine-readable indicia 104 or symbol 106 at one or more wavelengths. For example, the reader 112 may illuminate the machine-readable indicia 104 or symbol 106 sequentially a different wavelengths according to a defined sequence. The reader 112 senses or otherwise receives responses by the machine-readable indicia 104 or symbol 106 to the illumination. The reader 112, or some other processor-based system, may correlate the received responses with the sequence of illumination to determine a spectral profile or signature of the machine-readable indicia 104 or symbol 106.

Typically, responses or spectral profiles or signatures of machine-readable indicia 104 and/or symbols 106 read by a reader 112 will be analyzed or assessed with respect to one or more reference responses, spectral profiles or spectral signatures. In some instances, the reader 112 may be programmed with the reference responses. Programming may occur at the time of manufacturing of the reader 112, sale of the reader 112, distribution of the reader 112 or even during use of the reader 112. For example, a host computer system 124 may supply the reference responses, spectral profiles or spectral signatures, for example via wired or a wireless connection (e.g., radio and antenna 126). The host computer system 124 may be communicatively coupled with a nontransitory computer-readable medium 128 (e.g., hard drive, solid state drive) which, for example, stores the reference responses, spectral profiles or spectral signatures. In other instances, the host computer system 124 may perform the analysis, receiving responses, spectral profiles or spectral signatures via wired or a wireless connection. In this respect, the host computer system 124 may be configured or function as a server. The nontransitory computer-readable medium 128 may additionally, or alternatively, store responses, spectral profiles or spectral signatures collected by the reader 112 and/or may store the results of analysis of those responses, spectral profiles or spectral signatures performed by the reader 112. Such may be stored in a structured manner, for example in a table, spreadsheet or relational database.

The host computer system 124 may be located remotely from the reader 112. The reader 112 may be communicatively coupled directly, or indirectly, to the host computer system 124 via one or more network connections for instance via a local area network (LAN) and/or wide area network (WAN), which may include wired and/or wireless connections. In most instances, the communications between the reader 112 and the host computer system 124 will be secured, employing an extranet and/or encryption and authentication procedures. The host computer system 124 may implement "centralized" distribution of software or firmware updates, ensuring that all readers 112 will operate in an expected manner. The host computer system 124 may additionally, or alternatively implement "centralized" monitoring of an operational status of all readers 112, ensuring that all components are operating in an expected manner.

Figure 2:
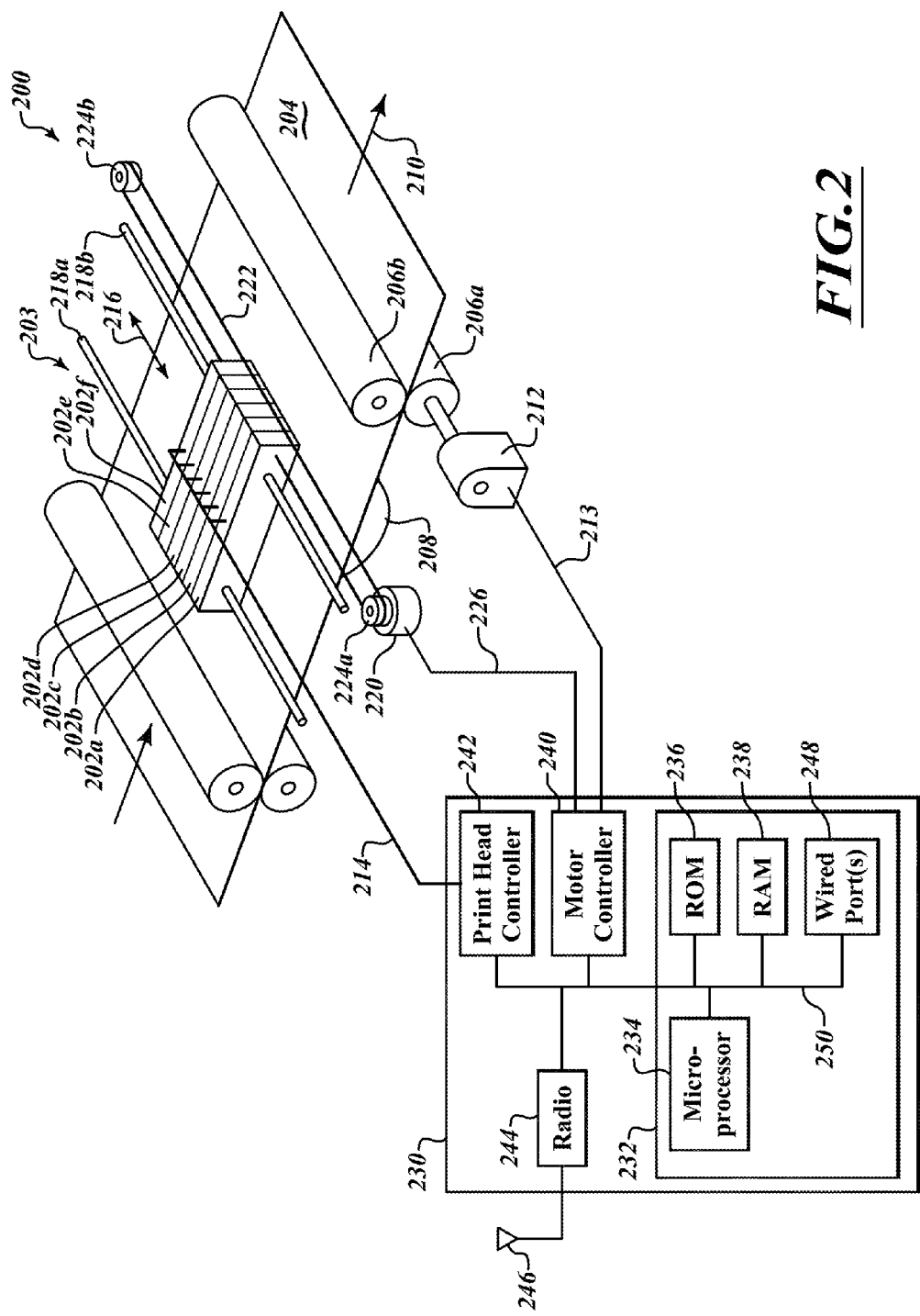
FIG. 2 is a schematic diagram of a portion of a printer including a number of marking media receptacles or reservoirs operable to form machine-readable indicia or symbols with various combinations of the marking media on various goods or objects, according to one illustrated embodiment.

FIG. 2 shows a portion of a printer 200, according to one illustrated embodiment.

The printer 200 may use a plurality of marking media contained in marking media receptacles 202a-202f (six illustrated, collectively 202) to print machine machine-readable indicia 104 (FIG. 1) and/or symbols 106 (FIG. 1) on a variety of substrate media 204. The printer 200 may have one or more printheads 203, which may, for example be comprised of the marking media receptacles 202, or may be fluidly communicatively coupled to the marking media receptacles 202 to receive marking media therefrom.

The printer 200 may include one or more rollers 206a, 206b (only two called out), platens 208 or other structures which define a media path (indicated by single headed arrow 210) along which the substrate media 204 moves during use. One or more of the rollers 206a may be driven, for example via an electric motor 212, such as a stepper motor. The electric motor 212 may be responsive to control signals received via a control line 213. An opposing roller 206b may function as a pinch roller, biasing the substrate media 204 onto the driven roller 206a. Additionally or alternatively, other ones of the rollers, platens 208 or other structures may be driven, for example by respective electric motors or solenoids.

The marking media receptacles 202 may take the form of cartridges, which may be selectively removable or replaceable in the printer 200. The marking media receptacles 202 may include one or more nozzles to eject or dispense droplets, streams or particles of marking media onto the substrate media 204. Many commercially available marking media receptacles may be suitable, for example various cartridges sold for use with inkjet printers. Marking media receptacles 202 such as conventional inkjet printer cartridges typically employ one or more transducers to control the ejection or dispensing of ink or toner therefrom, in response to controls signals received via one or more control lines 214. Alternatively, the marking media receptacles 202 may be non-removable reservoirs that are an integral part of the printer 200.

The marking media receptacles 202 may be mounted for movement laterally (i.e., across, indicated by double headed arrow 216) with respect to the substrate media 204 relative to a longitudinal direction of movement of the substrate media 204, indicated by arrow 210. For example, the marking media receptacles 202 may be slideably mounted on one or more rails 218a, 218b (two illustrated, collectively 218). A transducer may be physically coupled to move the marking media receptacles 202 with respect to the substrate media 204. For example, an electric motor 220 may be physically coupled to the marking media receptacles 202 by a transmission, for instance a belt 222 supported by pulleys 224a, 224b (two illustrated, collectively 224), and controlled to move the marking media receptacles 202 back and forth along the rails 218. The motor may be responsive to control signals received via a control line 226.

A control subsystem 230 controls movement of the substrate media 204 relative to the marking media receptacles 202 and controls ejection or dispensing of marking media from the marking media receptacles 202, coordinating the movements and ejection or dispensing of marking media to form the desired markings at the desired location(s) on the substrate media 204.

The control subsystem 230 may take a large variety of forms, only one of which is illustrated in FIG. 2. The control subsystem 230 may include a controller 232 including a processor 234 for instance a microcontroller, microprocessor, digital signal processor (DSP), programmable gate array (PGA), or application specific integrated circuit (ASIC). The controller 232 may include nontransitory storage media, for example nonvolatile memory such as a FLASH or read only memory (ROM) 236 and/or volatile memory such as random access memory (RAM) 238.

The control subsystem 230 may include one or more dedicated motor controllers 240 (only one illustrated) which supply control signals to the electric motors 212, 220 to control movement of the substrate media 204 and the marking media receptacles 202. Alternatively, the processor 234 may supply control signals directly to the electric motors 212, 220 to control movement of the substrate media 204 and the marking media receptacles 202.

The control subsystem 230 may include one or more dedicated printhead controllers 242 (only one illustrated) which supply control signals to the marking media receptacles 202 and/or printhead 203 to control ejection or dispensing of marking media therefrom. Alternatively, the processor 234 may supply control signals directly to the marking media receptacles 202 and/or printhead 203 to control ejection or dispensing of marking media therefrom.

The control subsystem 230 may include one or more radios 244 (only one illustrated) and antennas 246 (only one illustrated) to allow wireless communications with other devices or systems. For example, the radios 244 and antennas 246 to allow wireless communications with one or more host computer systems 124 (FIG. 1) allowing the receipt of information to be encoded and/or mappings of various combinations of marking media to human-readable or human-recognizable symbols (e.g., full ASCII symbol set). The control subsystem 230 may include one or more ports 248 to provide wired communications with other devices or systems. The ports 248 may take any variety of forms, for example serial ports such as Universal Serial Bus® (USB) compliant ports and/or parallel ports such as Ethernet® or FIREWIRE® compliant ports.

The control subsystem 230 may include one or more buses 250 the couple the other components. While illustrated as a single bus 250, the control subsystem 230 may include one or more separate buses, for example power buses, data buses, instruction buses, address buses, etc. While not illustrated, the control subsystem 230 may include one or more power supplies operable to convert electrical power to a form suitable for the various components of the printer 200. The power supply may, for example, include one or more transformers, rectifiers (e.g., passive diode bridge, active transistor bridge), DC/DC power converters (e.g., buck converter, boost converter, buck-boost converter, flyback converter). The power supply may, for example convert and/or condition conventional alternating current (AC) line or mains power to suitable voltages for use by the various components.

Figure 3:
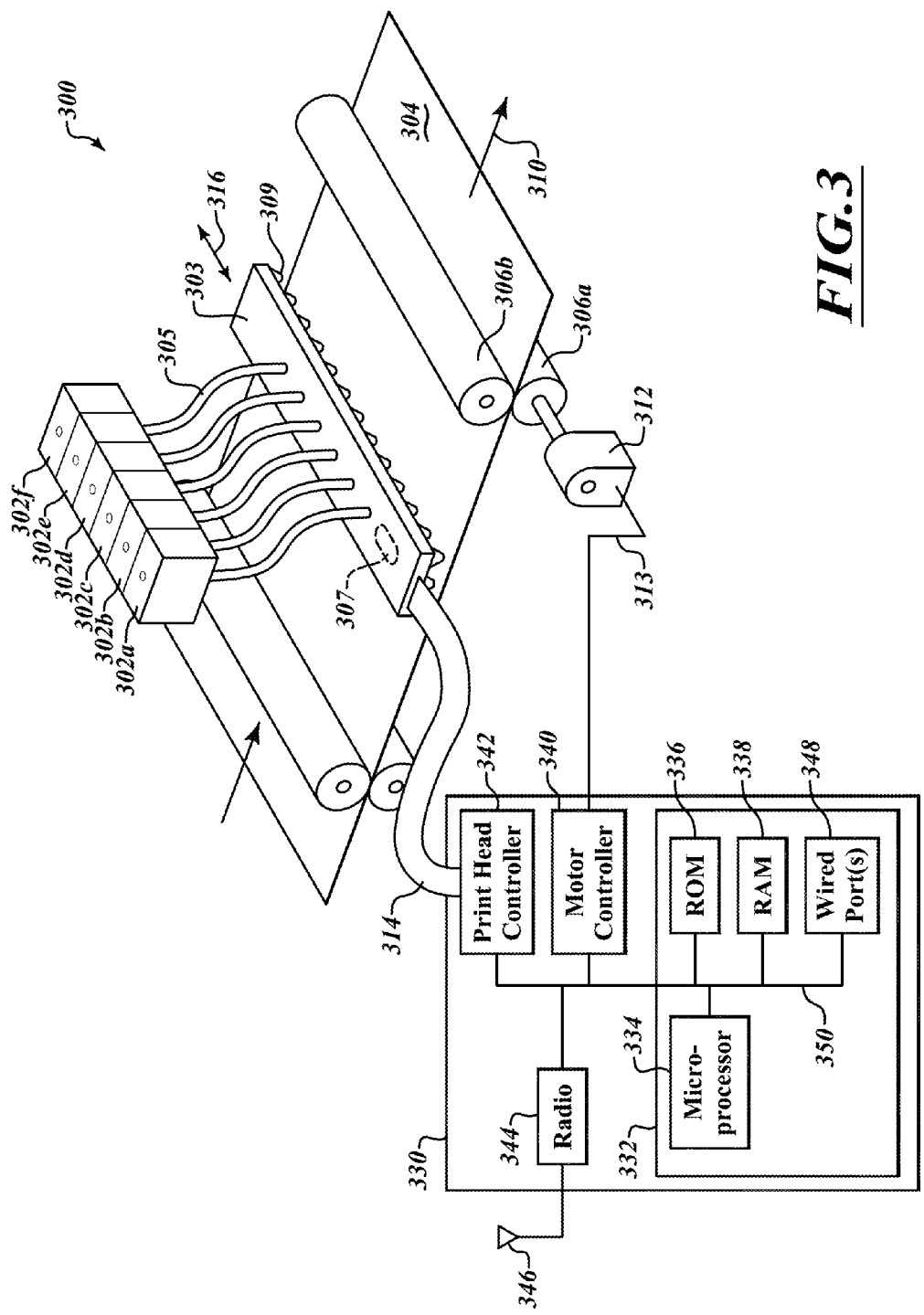
FIG. 3 is a schematic diagram of a portion of a printer including a number of marking media receptacles or reservoirs and combining chamber(s) operable to form machine-readable indicia or symbols with various combinations of the marking media on various goods or objects, according to another illustrated embodiment.

FIG. 3 shows a portion of a printer 300, according to one illustrated embodiment.

The printer 300 may use a plurality of marking media contained in marking media receptacles 302a-302f (six illustrated, collectively 302) to print machine machine-readable indicia 104 (FIG. 1) and/or symbols 106 (FIG. 1) on a variety of substrate media 304. The printer 300 may have one or more printheads 303, which may, for example be fluidly communicatively coupled by conduits 305 (only one called out in FIG. 3) to the marking media receptacles 302 to receive marking media therefrom. The printhead 303 may form or constitute a manifold, with one or more combining chambers 307 (one shown in hidden line) to combine the marking media in various combinations prior to ejecting, dispensing or otherwise applying the marking media to the substrate media 304. The printhead 303 may include one or more nozzles 309 (only one called out in FIG. 3) to eject or dispense or otherwise apply droplets, streams or particles of marking media (e.g., ink, toner) onto the substrate media 304. The printhead 303 may eject or dispense or otherwise apply the marking media in response to controls signals received via one or more control lines 314. Likewise, the printhead 303 may combine the marking media in various combinations in response to controls signals received via one or more control lines 314.

The printer 300 may include one or more rollers 306a, 306b (only two called out), platens 308 or other structures which define a media path (indicated by single headed arrow 310) along which the substrate media 304 moves during use. One or more of the rollers 306a may be driven, for example via an electric motor 312, such as a stepper motor. The electric motor 312 may be responsive to control signals received via a control line 313. An opposing roller 306b may function as a pinch roller, biasing the substrate media 304 onto the driven roller 306a. Additionally or alternatively, other ones of the rollers, platens 308 or other structures may be driven, for example by respective electric motors or solenoids.

The marking media receptacles 302 may take the form of cartridges, which may be selectively removable or replaceable in the printer 300. Alternatively, the marking media receptacles 302 may be non-removable reservoirs that are an integral part of the printer 300.

The printhead 303 may be mounted for movement laterally (i.e., across, indicated by double headed arrow 316) with respect to the substrate media 304 relative to a longitudinal direction of movement of the substrate media 304, indicated by arrow 310. For example, the marking media receptacles 302 may be slideably mounted on one or more rails (not illustrated in FIG. 3). A transducer (not illustrated in FIG. 3) may be physically coupled to move the printhead 303 with respect to the substrate media 304. The transducer may, for example, take the form of an electric motor or solenoid.

A control subsystem 330 controls movement of the substrate media 304 relative to the printhead 303. The control subsystem 330 also controls combining of the marking media in combining chambers 307, as well as the ejection, dispensing or otherwise applying of marking media from the printhead 303 to the substrate media 304. The control subsystem coordinates the combining, ejecting, dispensing or otherwise applying with the movement to form the desired markings at the desired location(s) on the substrate media 304.

The control subsystem 330 may take a large variety of forms, only one of which is illustrated in FIG. 3. The control subsystem 330 may include a controller 332 including a processor 334 for instance a microcontroller, microprocessor, digital signal processor (DSP), programmable gate array (PGA), or application specific integrated circuit (ASIC). The controller 332 may include nontransitory storage media, for example nonvolatile memory such as a FLASH or read only memory (ROM) 336 and/or volatile memory such as random access memory (RAM) 338.

The control subsystem 330 may include one or more dedicated motor controllers 340 (only one illustrated) which supply control signals to the electric motors 312 to control movement of the substrate media 304, and optionally the printhead 303. Alternatively, the processor 334 may supply control signals directly to the electric motors 312 to control movement of the substrate media 304, and optionally the printhead 303.

The control subsystem 330 may include one or more dedicated printhead controllers 342 (only one illustrated) which supply control signals to the printhead 303 to control combining of marking media and/or ejection, dispensing or application of marking media therefrom. Alternatively, the processor 334 may supply control signals directly to the printhead 303 to control combining, ejection, dispensing or other application of marking media therefrom.

The control subsystem 330 may include one or more radios 344 (only one illustrated) and antennas 346 (only one illustrated) to allow wireless communications with other devices or systems. For example, the radios 344 and antennas 346 to allow wireless communications with one or more host computer systems 124 (FIG. 1) allowing the receipt of information to be encoded and/or mappings of various combinations of marking media to human-readable or human-recognizable symbols (e.g., full ASCII symbol set). The control subsystem 330 may include one or more ports 348 to provide wired communications with other devices or systems. The ports 348 may take any variety of forms, for example serial ports such as Universal Serial Bus® (USB) compliant ports and/or parallel ports such as Ethernet® or FIREWIRE® compliant ports.

The control subsystem 330 may include one or more buses 350 the couple the other components. While illustrated as a single bus 350, the control subsystem 330 may include one or more separate buses, for example power buses, data buses, instruction buses, address buses, etc. While not illustrated, the control subsystem 330 may include one or more power supplies operable to convert electrical power to a form suitable for the various components of the printer 300. The power supply may, for example, include one or more transformers, rectifiers (e.g., passive diode bridge, active transistor bridge), DC/DC power converters (e.g., buck converter, boost converter, buck-boost converter, flyback converter). The power supply may, for example convert and/or condition conventional alternating current (AC) line or mains power to suitable voltages for use by the various components.

Figure 4:
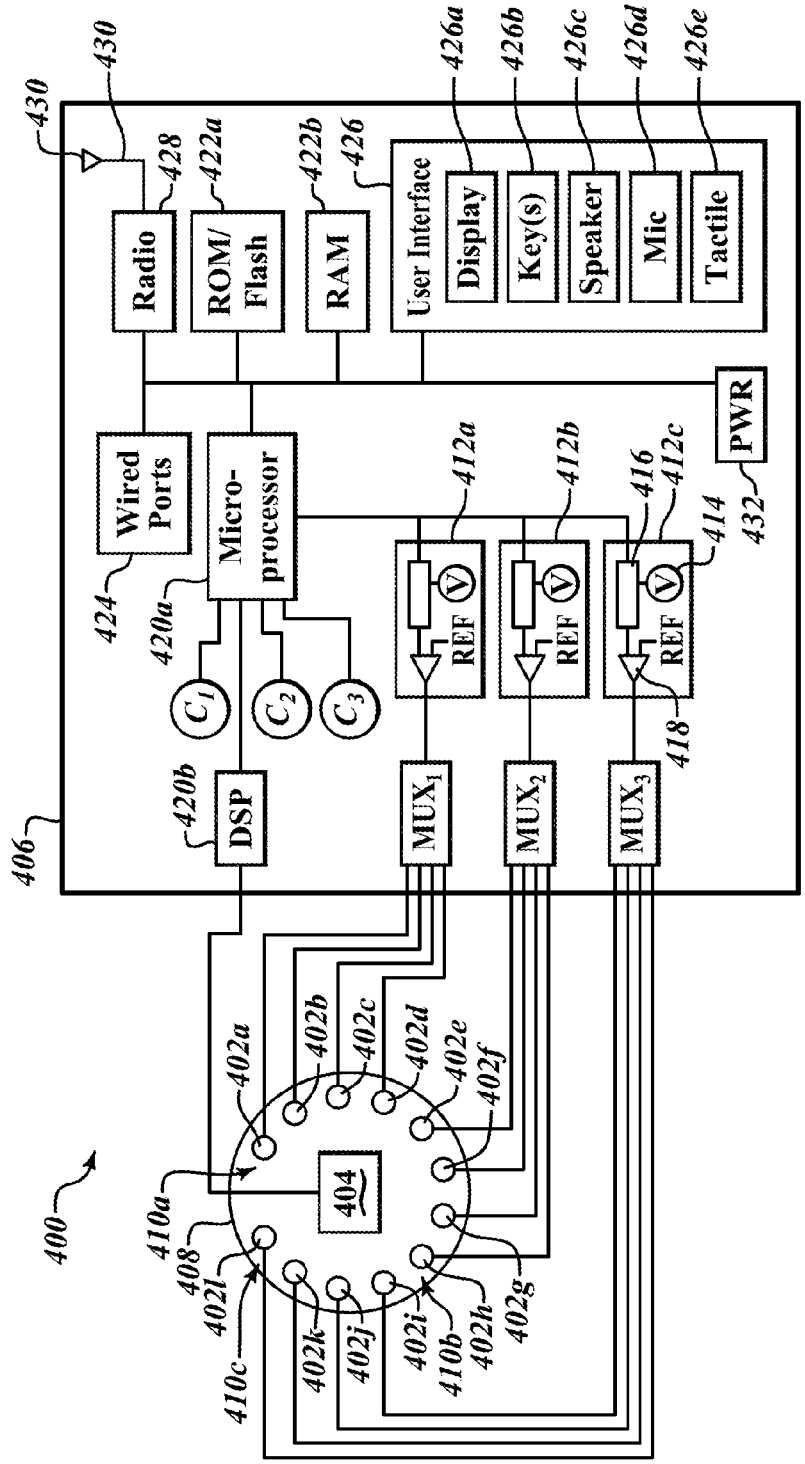
FIG. 4 is a schematic diagram of a machine-readable indicia or symbol reader operable to read machine-readable indicia or symbols formed of combinations of marking media, according to another illustrated embodiment.

FIG. 4 shows a machine-readable indicia or symbol reader 400 (hereinafter reader 400) operable to read machine-readable indicia 104 (FIG. 1) or symbols 106 (FIG. 1) formed of combinations of marking media, according to another illustrated embodiment.

The reader 400 includes one or more arrays of emitters 402a-402l (collectively 402, twelve shown) operable to emit electromagnetic radiation at various wavelengths. The reader 400 includes one or more sensors 404 (one shown) responsive to electromagnetic energy returned from substrate media 108 (FIG. 1) which bear the machine-readable indicia 104 (FIG. 1) or symbols 106 (FIG. 1). The reader 400 includes a control subsystem 406 communicatively coupled and operable to control the emitters 402, to receive data or information from the sensor(s) 404, and configured to at least correlate electromagnetic radiation sensed or otherwise detected by the sensor(s) 404 with the emitted wavelengths. In some instances, the control subsystem 406 may also process or analyze sensed information using the correlations, for example as described below.

The emitters 402 are selectively operable to emit electromagnetic energy in a number of bands of wavelengths at a number of different wavelengths.

Sources or emitters 402 such as LEDs primarily emit electromagnetic radiation concentrated at respective ones of a variety of different center bands. Such sources or emitters 402 may be denominated or characterized by the center band (e.g., blue LED). The precise wavelength of the center band may vary based on a number of parameters, for instance magnitude of drive current and temperature.

The reader may, for example, have a first number of sources or emitters that nominally emit in a first band or sub-band of the visible portion or band of the electromagnetic spectrum, a second number of sources or emitters that nominally emit in a second band or sub-band, and optionally a third number of sources or emitters that nominally emit in a third or sub-band. The control subsystem may operate the first set of sources or emitters which nominally emit in the first band (e.g., red band or center band in red band), the second set of sources or emitters that nominally emit in the second band (e.g., blue band or center band in blue band), and optionally the third set of sources or emitters that nominally emit in the third band (e.g., green band or center band in green band). The three or more bands or center bands may optionally be selected to achieve a combined output that is perceived by humans as white light. Notably, combinations of red, blue and green emission can produce illumination that is perceived by humans as white light.

The emitters 402 may take a variety of forms, for example various types of light emitting diodes (LEDs) including organic LEDs (OLEDs) and/or laser LEDs. OLEDs may advantageously allow production of a flexible device. Other forms of emitters 402 may be employed, for example other forms of lasers or other light sources. The lasers may, or may not, be tunable lasers. Alternatively, or additionally, the emitters 402 may take the form of one or more incandescent sources such as conventional or halogen light bulbs.

One, more or all of the emitters 402 may be operable to emit in part or all of an "optical" portion of the electromagnetic spectrum, including the (human) visible portion, near infrared portion and/or or near ultraviolet portions of the electromagnetic spectrum. Additionally, or alternatively, the emitters 402 may be operable to emit electromagnetic energy from other portions of the electromagnetic spectrum, for example the infrared, ultraviolet and/or microwave portions.

For example, one or more emitters 402 may emit in a band centered around 450 nm, while one or more of the emitters 402 may emit in a band centered around 500 nm, while a further emitter or emitters 402 may emit in a band centered around 550 nm. In some embodiments, each emitter 402 emits in a band centered around a respective frequency or wavelength, different than each of the other emitters 402. Using emitters 402 with different band centers advantageously maximizes the number of distinct samples that may be captured from a fixed number of emitters 402. This may be particularly advantageous where the reader 400 is relatively small, and has limited space or footprint for the emitters 402.

As an example, a first number of the emitters 402a-402c may be operable to emit at one, two or more wavelengths in a first band. For instance, each of those emitters 402a-402c may be selectively operated to emit at two different wavelengths in the red band of visible light. Each of the emitters 402a-402c may emit at a respective first wavelength when driven by a first signal, for example a first current level or magnitude. Each of the emitters 402a-402c may emit at a respective second wavelength when driven by a second signal different from the first signal, for example a second current level or magnitude. Thus, the emitters 402a-402c may, in combination, emit at, for example six different wavelengths. Additional current levels may be employed to increase the total number of wavelengths at which the first number of emitters 402a-402c emit.

Also as an example, a second number of the emitters 402d-402f may be operable to emit at one, two or more wavelengths in a second band. For instance, each of those emitters 402d-402f may be selectively operated to emit at two different wavelengths in the green band of visible light. Each of the emitters 402d-402f may emit at a respective first wavelength when driven by a first signal, for example a first current level or magnitude. Each of the emitters 402d-402f may emit at a respective second wavelength when driven by a second signal different from the first signal, for example a second current level or magnitude. Thus, the emitters 402d-402f may, in combination, emit at, for example six different wavelengths. Additional current levels may be employed to increase the total number of wavelengths at which the second number of emitters 402d-402f emit. The number of emitters, number of current levels and total number of wavelengths of the second number of emitters 402d-402f may be the same as, or different from, the number of emitters, number of current levels and total number of wavelengths of the second number of emitters 402a-402c.

Further as an example, a third number of the emitters 402g-402i may be operable to emit at one, two or more wavelengths in a third band. For instance, each of those emitters 402g-402i may be selectively operated to emit at two different wavelengths in the blue band of visible light. Each of the emitters 402g-402i may emit at a respective first wavelength when driven by a first signal, for example a first current level or magnitude. Each of the emitters 402g-402i may emit at a respective second wavelength when driven by a second signal different from the first signal, for example a second current level or magnitude. Thus, the emitters 402g-402i may, in combination, emit at, for example six different wavelengths. Additional current levels may be employed to increase the total number of wavelengths at which the third number of emitters 402g-402i emit. The number of emitters, number of current levels and total number of wavelengths of the third number of emitters 402g-402i may be the same as, or different from, the number of emitters, number of current levels and total number of wavelengths of either the first and/or the second number of emitters 402a-402c, 402d-402f, respectively.

Even further as an example, a fourth number of the emitters 402j-402k may be operable to emit at one, two or more wavelengths in a fourth band. For instance, each of those emitters 402j-402k may be selectively operated to emit at two different wavelengths in the infrared (IR) or near-infrared (NIR) band of light. Each of the emitters 402j-402k may emit at a respective first wavelength when driven by a first signal, for example a first current level or magnitude. Each of the emitters 402j-402k may emit at a respective second wavelength when driven by a second signal different from the first signal, for example a second current level or magnitude. Thus, the emitters 402j-402k may, in combination, emit at, for example four different wavelengths. Additional current levels may be employed to increase the total number of wavelengths at which the fourth number of emitters 402j-402k emit. The number of emitters, number of current levels and total number of wavelengths of the fourth number of emitters 402j-402k may be the same as, or different from, the number of emitters, number of current levels and total number of wavelengths of either the first, the second and/or the third number of emitters 402a-402c, 402d-402f, 402g-402i, respectively.

Yet further as an example, a fifth number of the emitters 402l may be operable to emit at one, two or more wavelengths in a fourth band. For instance, each of those emitters 402l may be selectively operated to emit at two different wavelengths in the ultraviolet (UV) or near-ultraviolet (NUV) band of light. Each of the emitters 402l may emit at a respective first wavelength when driven by a first signal, for example a first current level or magnitude. Each of the emitters 402e may emit at a respective second wavelength when driven by a second signal different from the first signal, for example a second current level or magnitude. Thus, the emitters 402l may, in combination, emit at, for example two different wavelengths. Additional current levels may be employed to increase the total number of wavelengths at which the fifth number of emitters 402l emit. The number of emitters, number of current levels and total number of wavelengths of the fifth number of emitters 402l may be the same as, or different from, the number of emitters, number of current levels and total number of wavelengths of either the first, the second, the third and/or the fourth number of emitters 402a-402c, 402d-402f, 402g-402i, 402j-402k, respectively.

The emitters 402 may have nominal wavelengths at which emission is expected to occur. However, the actual wavelengths of emission may vary from the nominal wavelengths for a variety of reasons, for example due to variation in temperature and/or variation between actual drive signal characteristics (e.g., current level) and nominal drive signal characteristics. Even with temperature compensation and other precautions there may be some variance between the actual and nominal wavelengths of emission. Thus, as used herein and in the claims, references to wavelength refer to nominal wavelengths. Also, while commonly identifiable bands have been given as examples, other bands may be employed. The bands may have any size bandwidth.

The distribution of spectral content for each emitter 402 may vary as a function of drive level (e.g., current, voltage, duty cycle), temperature, and other environmental factors, depending on the specific emitter 402. Such variation may be advantageously actively employed to operate one or more of the physical emitters 402 (also referred to as sources) as a plurality of "logical emitters," each of the logical emitters operable to provide a respective emission spectra from a respective physical emitter 402. Thus, for example, the center of the band of emission for each emitter 402 may vary according to a drive level (e.g., drive current level) and/or temperature. For example, the center of the band of emission for LEDs will vary with drive current or temperature. One way the spectral content can vary is that the peak wavelength can shift. However, the width of the band, the skew of the distribution, the kurtosis, etc., can also vary. Such variations may also be advantageously employed to operate the physical emitters 402 as a plurality of logical emitters. Thus, even if the peak wavelength were to remain constant, the changes in bandwidth, skew, kurtosis, and any other change in the spectrum can provide useful variations in the operation of the reader 400. Likewise, the center of the band of emission may be varied for tunable lasers. Varying the center of emission bands for one or more emitters 402 advantageously maximizes the number of samples that may be captured from a fixed number of emitters 402. Again, this may be particularly advantageous where the reader 400 is relatively small, and has limited space or footprint for the emitters 402.

As illustrated the emitters 402 may be carried by a substrate 408. The substrate 408 may take any of a large variety of forms, but most often will take the form of a circuit board or printed circuit board (PCB). The emitters 402 may be mounted to the substrate 408 by any known technique, for example soldering, bump arrays, flip chip fashion, etc.

The emitters 402 may be arranged in an ordered array, for example a linear or one-dimensional array, a two-dimensional array, a circle (as illustrated), concentric circles, or in groups of forming triangles, or other geometric shapes. Alternatively, the emitters 402 may be arranged in an unordered array having no discernable pattern. The emitters 402 may be arranged in a repeating pattern based on the nominal wavelength of emission. For example, the emitters 402 may be arranged where emitters 402 of different nominal wavelengths are arranged sequentially along a row, the pattern of wavelengths repeating along each row. Likewise, the emitters 402 of different nominal wavelengths may are arranged sequentially along a column, the pattern of wavelengths repeating along each column. Similarly, the emitters 402 of different nominal wavelengths may are arranged sequentially along a circle, the pattern of wavelengths repeating as the perimeter of the circle is traversed. Other arrangements are possible. For example, emitters 402 for each of three respective wavelengths may be grouped in sets of three, for instance arranged in triangular patterns. These triangular patterns may be repeated along rows and/or columns, or circles. Other groups of three emitters 402 of different wavelengths from the first, may be interposed between the other groups along each row or column or along a circle. Emitters 402 may be arranged to achieve a relatively even distribution by wavelength over any unit area of the array.

As illustrated, the sources or emitters 402 may be positioned or located spaced relatively apart from one another. The positioning of sources or emitters 402 relative to one another may be in two dimensions. For example, the sources or emitters 402 may be positioned spaced from each other on the printed circuit board 408, for instance positioned about the sensor 404 as illustrated in FIG. 4. Additionally, or alternatively the positioning of the sources or emitters 402 relative to one another may be in three dimensions, for example some raised in height further above a surface of the printed circuit board 408 relative to others. Also for example, the sources or emitters 402 may be angled with respect to each other. The positioning of sources or emitters 402 spaced apart from, raised above, and/or angled with respect to one another may advantageously provide illumination from different perspectives, potentially capturing more information.

A field of emission of one or more emitters 402 may be movable with respect to the printed circuit board 408. For example, one or more emitters 402 may be movable mounted with respect to the printed circuit board 408 or some other structure, such as mounted for translation along one or more axes, and/or mounted for rotation or oscillation about one or more axes. Alternatively, or additionally, the reader 400 may include one or more elements operable to deflect or otherwise position the emitted electromagnetic energy. The elements may, for example, include one or more optical elements, for example lens assemblies, mirrors, prisms, diffraction gratings, etc. For example, the optical elements may include an oscillating mirror, rotating polygonal mirror or prism, or MEMS micro-mirror that oscillates about one or more axes. The elements may, for example, include one or more other elements, for example permanent magnets or electromagnets such as those associated with cathode ray tubes and/or mass spectrometers.

The sensor 404 can take a variety of forms suitable for sensing a response (e.g., reflected, refracted, fluoresced or otherwise returned) of the machine-readable indicia or symbol to the emission of electromagnetic energy or radiation or the excitation thereby by the sources or emitters 402. For example, the sensor 404 may take the form of one or more photodiodes (e.g., germanium photodiodes, silicon photodiodes). Alternatively, or additionally, the sensor 404 may take the form of one or more photomultiplier tubes. Alternatively, or additionally, the sensor 404 may take the form of one or more CMOS image sensors. Alternatively, or additionally, the sensor 404 may take the form of one or more charge coupled devices (CCDs). Alternatively, or additionally the sensor 404 may take the form of one or more micro-channel plates. Other forms of sensors may be employed, which are suitable to detect the wavelengths expected to be returned in response to the particular illumination and properties of the object being illuminated.

The sensor(s) 404 may be mounted or carried by one or more structures. For example, sensor(s) 404 may be mounted or carried on or by a substrate, for example a circuit board such as the printed circuit board 408.

The sensor 404 may be formed as individual elements, a one-dimensional array of elements and/or a two-dimensional array of elements. For example, the sensor 404 may be formed by one germanium photodiode and one silicon photodiode, each having differing spectral sensitivities. The reader 400 may employ a number of photodiodes with identical spectral sensitivities, with different colored filters (e.g., gel filters, dichroic filters, thin-film filters, etc.) over the photodiodes to change their spectral sensitivity. This may provide a simple, low-cost approach for creating a set of sensor(s) with different spectral sensitivities, particularly since germanium photodiodes are currently significantly more expensive that silicon photodiodes. Also for example, the sensor 404 may be formed from one CCD array (one-dimensional or two-dimensional) and one or more photodiodes (e.g., germanium photodiodes and/or silicon photodiodes). For example, the sensor 404 may be formed as a one- or two-dimensional array of photodiodes. A two-dimensional array of photodiodes enables very fast capture rate (i.e., camera speed) and may be particularly suited to use in assembly lines or high speed sorting operations. For example, the sensor 404 may be formed as a one- or two-dimensional array of photomultipliers. Combinations of the above elements may also be employed.

The sensor 404 may optionally be a broadband sensor sensitive or responsive over a broad band of wavelengths of electromagnetic energy. Alternatively, the sensor 404 may be a narrowband sensor sensitive or responsive over a narrow band of wavelengths of electromagnetic energy. The sensor 404 may, for example, take the form of several sensor elements, as least some of the sensor elements sensitive or responsive to one narrow band of wavelengths, while other sensor elements are sensitive or responsive to a different narrow band of wavelengths. This approach may advantageously increase the number of samples that may be acquired using a fixed number of sources. In such embodiments the narrow bands may, or may not, overlap.

A field of view of the sensor(s) 404 or one or more elements of the sensor 404 may be movable with respect to the printed circuit board 408. For example, one or more elements of the sensor(s) 404 may be movably mounted with respect to the printed circuit board 408 or other structure, such as mounted for translation along one or more axes, and/or mounted for rotation or oscillation about one or more axes. Alternatively, or additionally, the reader 400 may include one or more elements operable to deflect or otherwise position the returned electromagnetic energy. The elements may, for example, include one or more optical elements, for example lens assemblies, mirrors, prisms, diffraction gratings, etc. For example, the optical elements may include an oscillating mirror, rotating polygonal mirror or prism, or MEMS micromirror that oscillates about one or more axes. The elements may, for example, include one or more other elements, example permanent magnets or electromagnets such as those associated with cathode ray tubes and/or mass spectrometers.

In some embodiments, the emitters 404 may also serve as the sensor(s) 404. For example, an LED may be operated to emit electromagnetic energy at one time, and detect returned electromagnetic energy at another time. For example, the LED may be switched from operating as a source to operating as a detector by reverse biasing the LED. Also for example, an LED may be operated to emit electromagnetic energy at one time, and detect returned electromagnetic energy at the same time.

The reader 400 may optionally include a protective window cover (not called out). The window cover may provide environmental protection to the emitters 402 and/or sensor(s) 404. The window cover is transparent or at least translucent to certain wavelengths of interest, for example the wavelengths emitted by the emitters 402 and/or to which the sensor(s) 404 is or are responsive. The window cover may hide the view of the emitters 402 from people. The cover may take the form of one or more layers of glass (e.g., Gorilla Glass®), polymers (e.g., acrylic), optical filters, and/or tints or colored gels. The window cover may, for example, have a smoky appearance or mirrored appearance.

While not illustrated, the reader 400 may include one or more optical components positioned in an optical path between the emitters 402 and an exit, window or aperture through which illumination from the emitters is projected into the environment from the reader 400 and/or between the window and aperture and the sensor(s) 404. For example, the reader 400 may include one or more lenses to focus or direct illumination. Lenses may include traditional optics, or may include adaptive optics (e.g., variable shape lenses). The reader 400 may include an adjustable aperture, allowing the control of the aperture setting. The reader 400 may additionally, or alternatively include one or more reflectors to direct illumination. For example, the reader 400 may include one or more oscillating reflectors or mirrors. The oscillating reflector may take a large variety of forms. For instance, the reader 400 may include a flat reflector which pivots back and forth, to scan illumination in one or two dimensions. Also for instance, the reader 400 may include a rotating polygonal reflector with a plurality of faces, for example a hexagonal or octagonal mirror. The reflector may, for instance take the form of a dichroic mirror, selectively substantially passing certain wavelengths and substantially reflecting other wavelengths. The reflector may take the form of a microelectromechanical (MEMS) reflector which oscillates about two perpendicular axes of rotation to achieve a scanning motion in two perpendicular directions. The reader 400 may additionally include a range finder subsystem to determine a distance between the reader and a particular substrate media. The determined distance may be used to automatically adjust various optical components of the reader 400, for example lenses to vary focus, aperture to vary the amount of illumination provided to the sensor 404.

The sources or emitters 402 (twelve shown) may, for example, be organized in groups, sets or channels 410a, 410b, 410c (only three groups, sets or channels illustrated, collectively 410), for instance to facilitate operation thereof by the control subsystem 406. For instance, sources or emitters 402a-402d may be organized in a first group, set or channel 410a, emitters 402e-402h may be organized in a second group, set or channel 410b, and emitters 402i-402l may be organized in a third group, set or channel 410c. While illustrated in spatially separate or distinct groups, sets or channels 410a, 410b, 410c of the sources or emitters 402 of the different groups, sets or channels 410a, 410b, 410c may be spatially intermingled or interleaved with one another.

While not illustrated as such, the sources or emitters 402 may be organized into groups, sets or channels 410 based on the various wavelengths at which the sources or emitters emit. For instance, sources or emitters 402 that emit at various red wavelengths may be organized into one group, set or channel 410, sources or emitters 402 that emit at various blue wavelengths may be organized into another group, set or channel 410, while sources or emitters 402 that emit at various green wavelengths may be organized into a further group, set or channel 410.

The control subsystem 406 drives the sources or emitters 402 with adjustable drive currents, which may be generated or supplied from one or more programmable current sources or current sinks 412a, 412b, 412c (only three illustrated, collectively 412). For example, a respective current source 412a, 412b, 412c may supply an adjustable drive current level to the sources or emitters 402 of the respective groups, sets or channels 410a, 410b, 410c. The sources or emitters 402 of each group, set or channel 410a, 410b, 410c may be coupled to ground via respective resistors (not shown).

Each of the current sources 412 is operable to supply an adjustable level of current in response to a digital signal. Each current source 412 may include a voltage source 414 (only one called out in FIG. 4), a digital-to-analog (DAC) converter 416 (only one called out in FIG. 4) and an operational amplifier 418. The voltage source 414 provides a constant voltage to at least the DAC 416. The DAC 416 receives input signals, for instance a serial data input signal IN, a serial clock signal CLK and a synchronization signal SYNC. The DAC 416 is coupled to drive an input (e.g., noninverting pin) of the operational amplifier 418. The other input (e.g., noninverting pin) of the operational amplifier 418 may receive a reference signal REF, for example from a voltage divider resistor network (not illustrated), which will typically include a feedback path from an output of the operational amplifier 418. The operational amplifier 418 is responsive to the DAC 416 to provide the adjustable drive current to drive the sources or emitters 402. A suitable voltage source 414 may, for example, include the voltage reference device commercially available from Analog Devices under product designation ADR445. A suitable DAC 416 may, for example, include the nanoDAC® commercially available from Analog Devices under product designation AD5621. Suitable operational amplifiers 418 may, for example, include those commercially available from Analog Devices under product designations OP37 and AD711.

The control subsystem 406 of the reader 400 may include one or more multiplexers $MUX_1$, $MUX_2$, $MUX_3$ to couple drive current to selected ones of the sources or emitters 402. The multiplexers $MUX_1$, $MUX_2$, $MUX_3$ may be responsive to respective control signals $C_1$, $C_2$, $C_3$ to steer the drive current to selected sources or emitters 402 to produce emission in a defined sequence of wavelengths, and optionally at a defined sequence of magnitudes.

The reader 400 may employ other numbers of sources or emitters 402, current sources or sinks 412, and/or multiplexers $MUX_1$, $MUX_2$, $MUX_3$, as well as other arrangements of such components. For example, the control subsystem 406 may omit the multiplexers $MUX_1$, $MUX_2$, $MUX_3$. Also for example, the control subsystem 406 may employ one or more power transistors (e.g., MOSFETs, IGBTs) to supply drive current to the emitters 402.

The control subsystem 406 may, for example, include one or more controllers, for example one or more microprocessors 420a, digital signal processor (DSPs) 420b, programmable logic controllers (PLCs), programmable gate arrays (PGAs), application specific integrated circuits (ASICs), microcontrollers, and/or programmable system on chips (PSOCs) (collectively 420).

The control subsystem 406 may include one or more non-transitory storage media (e.g., memory), for example non-volatile memory such as Flash memory or read only memory (ROM) 422a and/or volatile memory such as random access memory (RAM) 422b (collectively 422). The non-transitory storage media 422 may store instructions executable by the controller(s) 420, and/or data, which causes the controller(s) 420 to operate the reader 400 as described herein. Such may include generating or receiving sequences for operating the sources or emitters 402, for example sequences of wavelengths of emission. Such may optionally include correlating received responses with emission, and/or processing or analyzing correlated responses with reference responses, spectral profiles or signatures to automatically analyze the machine-readable indicia or symbols.

The control subsystem 406 may include one or more analog-to-digital converters (ADCs) (not shown) to convert analog signals to digital signals. Such may be employed, for example, where analog signals are being provided to the control subsystem 406 directly from analog sensors.

The control subsystem 406 may include one or more communications ports, for example parallel or ports 424 to provide communications with other components of the spectral analysis surveillance system 500, other surveillance systems and/or an integrated surveillance system. Such ports 424 may, for example, allow for networked (e.g., TCP/IP, UDP/IP, ETHERNET) and/or non-networked (e.g., Universal Serial Bus or USB, FIREWIRE) communications. The control subsystem 406 may include suitable communications controllers (not shown) to implement communications.

The control subsystem 406 may additionally include one or more buffers (not shown). The buffer(s) may be communicatively coupled to buffer data or information received via ADCs, parallel and/or serial ports 424. For example, the buffer(s) may buffer data received from sensor(s) 404 while awaiting processing (e.g., correlation, analysis) by the controller(s) 420.

The control subsystem 406 may include a user interface (UI) 426. The UI 426 may take any of a large variety of forms. For example, the UI 426 may include a display 426a operable to display information, and/or to present a graphical user interface (GUI). The GUI may include a number of user selectable icons, pull-down menus, radio buttons, dialog boxes, etc. The display 426a may, for instance, be a touch sensitive display response to user contact. The UI 426 may, for example, include one or more keys or switches 426b. The keys or switches 426b may form a physical or a virtual keypad or keyboard. The UI 426 may, for example, include a speaker 426c to provide aural alerts or messages. The UI 426 may, for example, include a microphone 426d to allow spoken user input, for instance commands. The UI 426 may, for example, include piezoelectric or MEMS transducer 426e operable to produce tactile sensations.

The control subsystem 406 may optionally include one or more radios 428 (only one shown) communicatively coupled to one or more antennas 430 (only one shown) to allow communications to, and from, the reader 400. The radio(s) 428 may take a large variety of forms which allow wireless communications. For example, the radio(s) 428 may take the form of one or more transmitters, receivers, or transceivers. Likewise, the antenna(s) 430 may take a large variety of forms which allow wireless communications. The radio(s) 428 and antenna(s) 430 may provide wireless communications at a variety of different frequencies and or communications protocols. For example, wireless communication may occur in any part of the radio or microwave portions of the electromagnetic spectrum. For example, wireless communication may employ time division multiple access (TDMA), code division multiple access (CDMA), frequency division multiple access (FDMA), WI-FI® or 802.11, BLUETOOTH® or any other communications protocol.

The reader 400 may include a power supply 432 that receives electric power via a power source (not shown). The power source may take a large variety of forms. For example, the power source may be a source of direct current (DC), for example one or more chemical batteries, arrays of super- or ultra-capacitors or ultracapacitors, and/or fuel cells. Alternatively, the power source may be a source of alternating current (AC), for example a line or grid that supplies alternating current at 60 Hz commonly found in residential sites and commercial facilities.

The power supply 432 may take any of a variety of forms, dependent on the power source and the various components of the reader 400 which receive power from the power supply 432. The reader 400 may employ two or more power supplies 432, for example respective power supplies for power buses of different voltages (e.g., 12V, 5V, 3.5V) and/or associated systems or subsystems. The power supply 432 may include one or more DC/DC power converters (not shown), for example switch mode power converters such as buck converters, boost converters, buck-boost converters, or flyback converters, that step up and/or step down a voltage of DC power. The power supply 432 may include one or more alternators (not shown) that invert DC power to AC power. The power supply 432 may include one or more rectifiers (not shown) that rectify AC power to DC power. The power supply 432 may include one or more power conditioning circuits (not shown) which condition power, for example conditioning a line voltage to a cleaner form for use with the electronics of the reader 400.

The various components of the control subsystem 406, as well as other components of the reader 400, may be coupled by one or more buses, collectively illustrated as 434. The buses 434 may, for example, include one or more power buses, instruction buses, address buses, data buses, and/or communications buses.

The sources and emitters 402, programmable current sources 412, and/or associated multiplexers $MUX_1$, $MUX_2$, $MUX_3$ may be carried by one or more circuit boards or other substrates, for example printed circuit board 408. The sensor(s) 404 and associated multiplexer(s) (not shown) may be carried by one or more circuit boards or other substrates, for example printed circuit board 408, or by some other, separate circuit board or substrates 532. The control subsystem 406 may be carried by one or more circuit boards or other substrates (not shown), which may be different from the circuit board or substrates 408 which carry the sources or emitters 402 and/or the sensor(s) 404.

The control subsystem 406 may be configured to control when one or more sources or emitters 402 is driven to emit, how long the sources or emitters 402 are driven to emit, the wavelength at which the sources or emitters 402 are driven to emit, a magnitude or intensity at which the sources or emitters 402 emit, and/or any impose any form of modulation that is desired in or on a sequence of wavelengths or emissions. Thus, the control subsystem 406 may cause the sources or emitters 402 to emit at different wavelengths according to one or more defined sequences.

The control subsystem 406 may be configured to selectively receive and/or preprocess images or signals or other data produced by the sensor(s) 404. For example, where sensor(s) 404 include analog video cameras, the control subsystem 406 may include or implement a frame grabber. Frame grabbing may by synchronized or correlated with the emissions by the sources or emitters 402. Where sensor(s) 404 include digital still cameras or digital video cameras, the control subsystem 406 may sample the digital image data or signals produced by the cameras. The digital image data or signals may be synchronized or correlated with the emissions by the sources or emitters 402. For example, sampling may occur a defined time after a given emission to implement or facilitate correlation between emissions and responses. Where sensor(s) 402 include photodiodes or similar devices, the control subsystem 406 may sample the analog or digital output signal indicative of a magnitude of response detected by the photodiode(s). The control subsystem 406 may synchronize or correlate the analog or digital output signals with the emissions by the sources or emitters 402.

The control subsystem 406 may optionally compare the synchronized or correlated responses, spectral profiles or signatures with one or more reference responses, spectral profiles or signatures to decode the information encoded in the machine-readable indicia or symbol. The control subsystem 406 may, for example, match the sensed responses, spectral profiles or signatures to human-readable or comprehensible characters.

FIG. 5 shows a piece of personal identification 500 bearing a machine-readable indicia 502, according to one illustrated embodiment.

The piece of personal identification 500 is an example of the previously discussed substrate media, and may take any of a large variety of forms. As illustrated in FIG. 5, the piece of personal identification 500 takes the form of a driver license or identification card. However, the piece of personal identification 500 may take the form of any other piece of identification media, for example, a passport, voter registration card, identification card issued by an employer, building, or other facility, military identification card, pilot license, player club card, season pass (e.g., season lift ticket, season sports event ticket, season concert ticket, pass to amusement park, pool or beach), credit, debit, prepaid or gift cards.

The piece of personal identification 500 typically includes a photograph or image 504 of a person whom the piece of personal identification 500 identifies. The piece of personal identification 500 also typically includes information about the person, for example name 506a, date of birth 506b, address 506c, height 506d, weight 506e, color of eyes 506f, color of hair 506g, restrictions (e.g., required eyewear, limitations on use such as at night) (not shown), endorsements (e.g., permission to operate certain nonstandard vehicles) (not shown).

The piece of personal identification 500 typically includes information about the issuing authority (e.g., country, state, province, county, parish, city, municipal authority, business, facility, bank, credit union, credit issuer), for example an issuer identification 508a. Such may also include an official seal or other insignia 508b.

The piece of personal identification 500 typically includes various anti-counterfeiting measures or techniques. The machine-readable indicia, or alternatively a multi-character machine-readable symbol, may enhance security. The machine-readable indicia 502 may be formed using one of various possible combinations of the marking media, as discussed herein. The machine-readable indicia 502 is indicated in broken line since in many instances the machine-readable indicia 502 will not be discernable to a human. For example, the machine-readable indicia 502 may appear to an unaided human as the same or almost the same color as a background color or of the substrate media itself. Such may advantageously reduce the occurrence of successfully attempts at counterfeiting. In other instances, the machine-readable indicia 502 may be distinct from the background color or color of the substrate media. Even in such instances, a plurality of machine-readable indicia 502 encoding different information may appear to be homogenous in color to an unaided observer. Such renders the information encoded in the machine-readable indicia 502 indiscernible to humans without the aid of a reader 112 (FIG. 1), 400 (FIG. 4), and which typically requires a knowledge of the specific symbology, and possible sequence of illumination used to generate responses which the symbology maps to human-readable characters.

FIGS. 6A and 6B show a machine-readable symbol 600 formed using various combinations of marking media to encode information therein, according to one illustrated embodiment. In particular, FIG. 6A shows an exemplary mapping of combinations of marking media to a two-dimensional area to encode information in the symbol 600, each marking medium represented by a respective letter A-F, the combinations represented by combinations of the letters A-F. FIG. 6B shows how the machine-readable symbol 600 may appear to an unaided human observer.

As best illustrated in FIG. 6A, the machine-readable symbol 600 may take the form of a two-dimensional machine-readable symbol in which symbol characters are arrayed in rows and columns, similar in some respects to more conventional area or matrix code symbols. Hidden lines illustrate respect cells or areas in which each symbol character appears. These hidden lines are for illustrative purposes only, and typically do not exist or appear in the machine-readable symbol 600.

For example, using a palette of six different marking media, each with their own respective spectral distinguishing characteristic(s), a total of forty combinations may be formed. These combinations are represented in FIG. 6 by combinations of the letters A-F. Since the marking media may be combined or mixed together, or overlie each other, there is not necessarily any spatial separation between marking media of any particular combination. Thus, permutations (e.g., ABC, ACB, CBA, BCA, CAB) of the marking media are not relied on to define the symbology.

As best illustrated in FIG. 6B, the machine-readable symbol 600 may appear homogenous to a human without the aid of a reader 112 (FIG. 1), 400 (FIG. 4) or some other device. Such may be realized via the selection of marking media in general, the selection of combinations of marking media, and/or by use of additional marking media that neutralizes the other marking media of at least some of the combinations. For example, the marking media may be selected such that each is spectrally distinguishable to one another at selected wavelengths by a machine (e.g., reader), but are also not distinguishable to one another by a human without the aid of a machine. Also for example, the marking media may be selected such that each is spectrally distinguishable to one another at selected wavelengths by a machine (e.g., reader), but combinations considered valid under a defined symbology are not distinguishable to one another by a human without the aid of a machine. Thus, color mixing may render a combination imperceptibly distinguishable from one, more or all other combinations, while the spectrally distinctive characteristic of each component of the combination still remains detectable by a machine (e.g., reader). For instance, each combination of marking media considered a valid combination under a defined symbology may be visually perceived by a human as the color gray or shades of gray. Gray is the result of a fairly large variety of color combinations. Yet at least one spectral characteristic (e.g., reflectance, florescence, or absorption at particular wavelength) of each component (i.e., marking media) of each combination remains discernable by a machine. Also for example, one or more additional marking media may used in one, some or all of the combinations to render the resulting machine-readable symbol characters indistinguishable to one another by a human without the aid of a machine. Yet at least one spectral characteristic (e.g., reflectance, florescence, or absorption at particular wavelength) of each component (i.e., marking media) of each combination remains discernable by a machine despite the inclusion of additional marking media in the combination.

Figure 7:
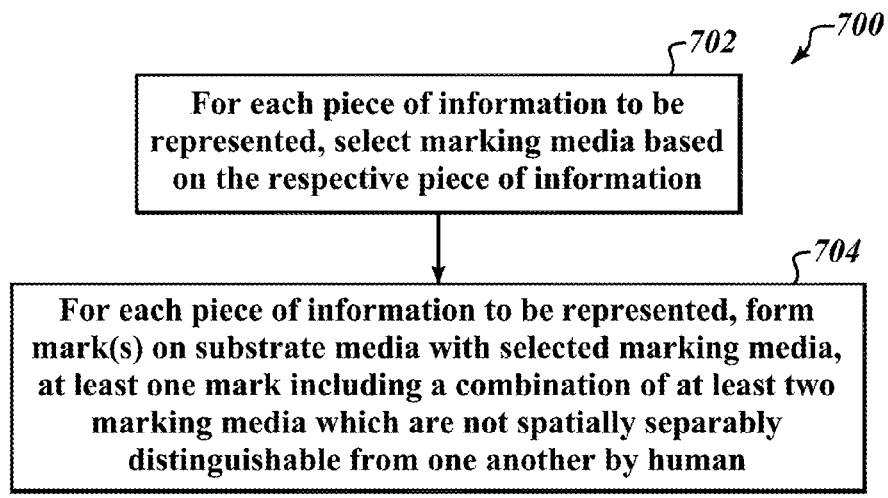
FIG. 7 is a flow diagram showing a high level of operating a printer to form or applying marking media to substrate media to form one or more machine-readable indicia or symbols, according to one illustrated embodiment.

FIG. 7 shows a method 700 of operating a printer to form or apply marking media to substrate media to form one or more machine-readable indicia or symbols, according to one illustrated embodiment.

At 702, for each of a number of pieces of information to be represented on one or more substrate media, the printer or a control system thereof, selects from a number of consumable marking media available in the printer based on the respective piece of information to be represented. Each of the marking media having at least one respective spectral distinguishing characteristic which is different from the at least one spectral distinguishing characteristic of the other ones of the marking media.

At 704, for each of a number of pieces of information to be represented on one or more substrate media, the printer or a printhead thereof forms a mark on the substrate media with the marking media selected for the respective one of the pieces of information. Notably, at least one of the marks includes a combination of at least two of the marking media which are not spatially separably distinguishable from one another by an unaided human.

Figure 8:
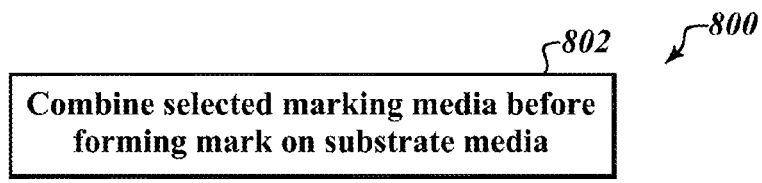
FIG. 8 is a flow diagram showing a method of operating a printer to form or apply marking media to substrate media to form one or more machine-readable indicia or symbols, according to one illustrated embodiment, useful in addition to the method of FIG. 7.

FIG. 8 shows a method 800 of operating a printer to form or apply marking media to substrate media to form one or more machine-readable indicia or symbols, according to one illustrated embodiment. The method 800 may be employed in addition to the method 700 (FIG. 7).

At 802, the printer combines the selected marking media before forming the respective mark on the substrate media. Combining may occur, for example, in a combining chamber. Combining may, or may not, include active mixing of the marking media.

Figure 9:
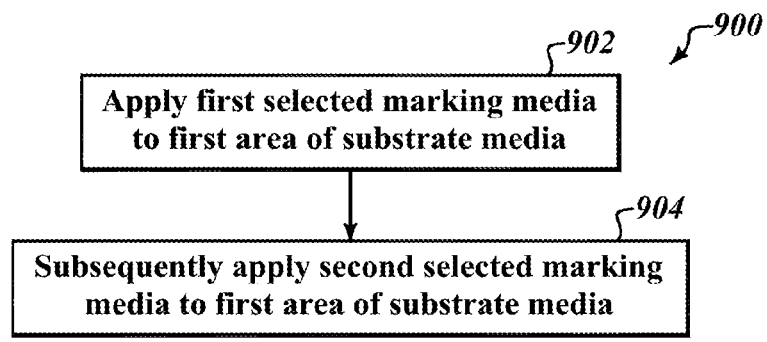
FIG. 9 is a flow diagram showing a method of operating a printer to form or apply marking media to substrate media to form one or more machine-readable indicia or symbols, according to one illustrated embodiment, useful as part of the method of FIG. 7.

FIG. 9 shows a method 900 of operating a printer to form or apply marking media to substrate media to form one or more machine-readable indicia or symbols, according to one illustrated embodiment. The method 900 may be employed as part of the method 700 (FIG. 7).

At 902, the printer forms a mark on the substrate media with the marking media selected for the respective one of the pieces of information by applying (e.g., printing, dispensing, ejecting) a first one of the selected marking media to a first area of the substrate media. At 904, the printer continues to form the mark on the substrate media by subsequently applying at least a second one of the selected marking media to the first area of the substrate media. Application of additional marking media may follow to achieve the specific combination.

The subsequent application may occur before the marking media previously applied dries. Thus, the combination of marking media may, to at least some extent, mix or become intermingled on the substrate media. Applying at a single location or area may be used to form a single machine-readable indicia, for example a single dot from which information may be discerned. For example, the combination of marking media may indicate a country of origin for a good or a manufacturing plant.

Figure 10:
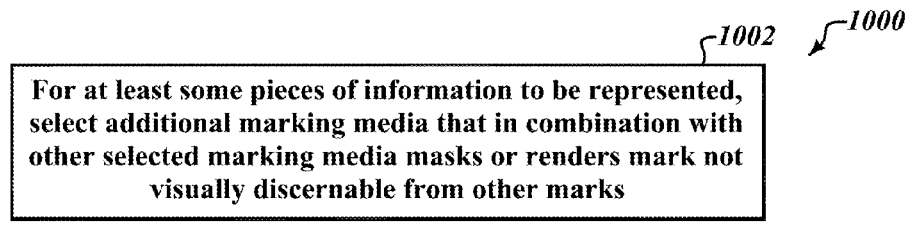
FIG. 10 is a flow diagram showing a method of operating a printer to form or apply marking media to substrate media to form one or more machine-readable indicia or symbols, according to one illustrated embodiment, useful in addition to the method of FIG. 7.

FIG. 10 shows a method 1000 of operating a printer to form or apply marking media to substrate media to form one or more machine-readable indicia or symbols, according to one illustrated embodiment. The method 900 may be employed in addition to the method 700 (FIG. 7).

At 1002, the printer, for each of at least some of the number of pieces of information to be represented on one or more substrate media, selects from the number of consumable marking media available in the printer at least one additional marking media that in combination with the other selected marking media masks the resulting mark. As explained above, certain different combinations of marking materials which are distinguishable by a machine, may be perceived as homogenous by a human. For example, combinations of two or three marking media may be mapped to specific information or human-readable symbols or characters (e.g., ASCII character set). One or more additional marking media may render one or more of those combinations effectively visually indistinguishable from one another by an unaided human. For example, a respective additional marking media may be identified such that each combination is perceived a gray or a shade of gray, thereby masking or obscuring the machine-readable indicia or symbol. Further, the resulting color may be selected to match a background color or the color of the substrate media itself.

Figure 11:
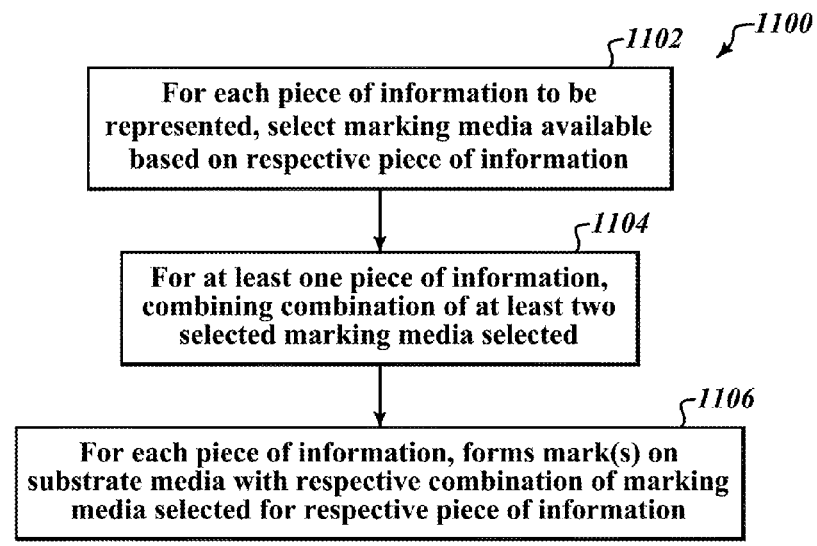
FIG. 11 is a flow diagram showing a high level method of operating a printer to form or apply marking media to substrate media to form one or more machine-readable indicia or symbols, according to one illustrated embodiment.

FIG. 11 shows a method 1100 of operating a printer to form or apply marking media to substrate media to form one or more machine-readable indicia or symbols, according to one illustrated embodiment.

At 1102, for each of a number of pieces of information to be represented on one or more substrate media, the printer, or control subsystem thereof, selects from a number of consumable marking media available in the printer based on the respective piece of information to be represented. As previously explained, each of the marking media having at least one respective spectral distinguishing characteristic. The at least one spectral distinguishing characteristic of each one of the marking media is different from the at least one spectral distinguishing characteristic of the other ones of the marking media.

At 1104, for at least one of the pieces of information, the printer combines a combination of at least two of the marking media selected for the respective one of the pieces of information. Such may, for example occur in a combining chamber or manifold of a printhead. The number of marking media in any given combination may differ from the number of marking media in another combination. For example, two of the marking media may be combined to represent a first piece of information. While five of the marking media may be combined to represent a second piece of information. As used herein and in the claims, a combination of marking media may consist of a single marking medium, two different marking media, or more than two different marking media.

At 1106, for each of a number of pieces of information to be represented on one or more substrate media, the printer or printhead forms a mark on the substrate media with the marking media selected for the respective one of the pieces of information. The printer may employ numerous ways of forming a mark including deposit or application of ink or toner to the substrate media.

The method 1000 (FIG. 10) may additionally be performed as part of the method 1100 (FIG. 11), to mask, obscure or homogenize the visual perception of the resulting machine-readable indicia or symbol.

Figure 12:
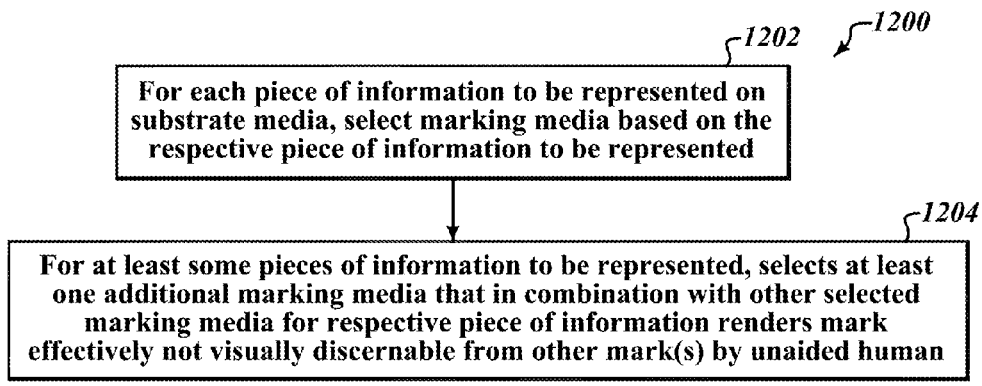
FIG. 12 is a flow diagram showing a high level method of operating a printer to form or apply marking media to substrate media to form one or more machine-readable indicia or symbols, according to one illustrated embodiment.

FIG. 12 shows a method 1200 of operating a printer to form or apply marking media to substrate media to form one or more machine-readable indicia or symbols, according to one illustrated embodiment.

At 1202, for each of a number of pieces of information to be represented on one or more substrate media, the printer or control subsystem thereof selects from a number of consumable marking media available in the printer based on the respective piece of information to be represented. As previously explained, each of the marking media having at least one respective spectral distinguishing characteristic. The at least one spectral distinguishing characteristic of each one of the marking media is different from the at least one spectral distinguishing characteristic of the other ones of the marking media.

At 1204, for each of at least some of the number of pieces of information to be represented on one or more substrate media, the printer or control subsystem thereof selects from the number of consumable marking media available in the printer at least one additional marking media that in combination with the other selected marking media for the respective mark renders the respective mark effectively not visually discernable from other ones of the marks by an unaided human observer. As previously explained, often one or more marking media may be added to a combination of marking media to render the resulting machine-readable indicia or symbol visually discernable from other machine-readable indicia or symbol. For example, various combinations mapped by a symbology to certain defined information may be rendered a visually homogenous color (e.g., gray) by addition of one or more additional marking media. The particular additional marking media may vary based on the underlying or primary combination.

Figure 13:
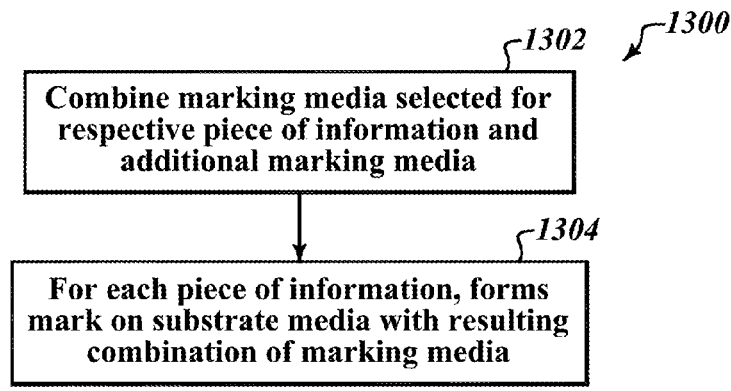
FIG. 13 is a flow diagram showing a method of operating a printer to form or apply marking media to substrate media to form one or more machine-readable indicia or symbols, according to one illustrated embodiment, useful in addition to the method of FIG. 12.

FIG. 13 shows a method 1300 of operating a printer to form or apply marking media to substrate media to form one or more machine-readable indicia or symbols, according to one illustrated embodiment. The method 1300 may be employed in addition to the method 1200 (FIG. 12).

At 1302, the printer or printhead combines the marking media selected for the respective one of the pieces of information with the additional marking media selected for the respective one of the pieces of information. Such combining may, for example, occur in a combining chamber or manifold. For example, the printer or printhead may combine at least two of the marking media selected for a first one of the pieces of information and at least one of the additional marking media selected for the respective first one of the pieces of information.

At 1304, for each of a number of pieces of information to be represented on one or more substrate media, the printer or printhead forms a mark on the substrate media with the resulting combination of marking media for the respective one of the pieces of information.

Figure 14:
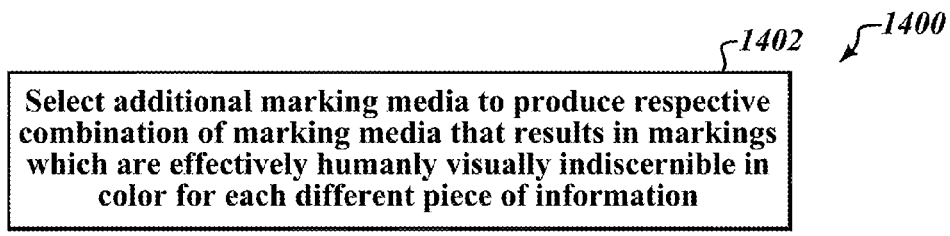
FIG. 14 is a flow diagram showing a method of operating a printer to form or apply marking media to substrate media to form one or more machine-readable indicia or symbols, according to one illustrated embodiment, useful in addition to the method of FIG. 13.

FIG. 14 shows a method 1400 of operating a printer to form or apply marking media to substrate media to form one or more machine-readable indicia or symbols, according to one illustrated embodiment. The method 1400 may be employed in addition to the method 1300 (FIG. 13).

At 1402, the printer or control subsystem thereof selects the additional marking media to produce a respective combination of marking media that results in markings which are effectively humanly visually indiscernible in color for each different piece of information. The printer or control subsystem may, for example, select one or more additional marking media which renders the resulting machine-readable indicia or symbol gray or a shade of gray.

Figure 15:
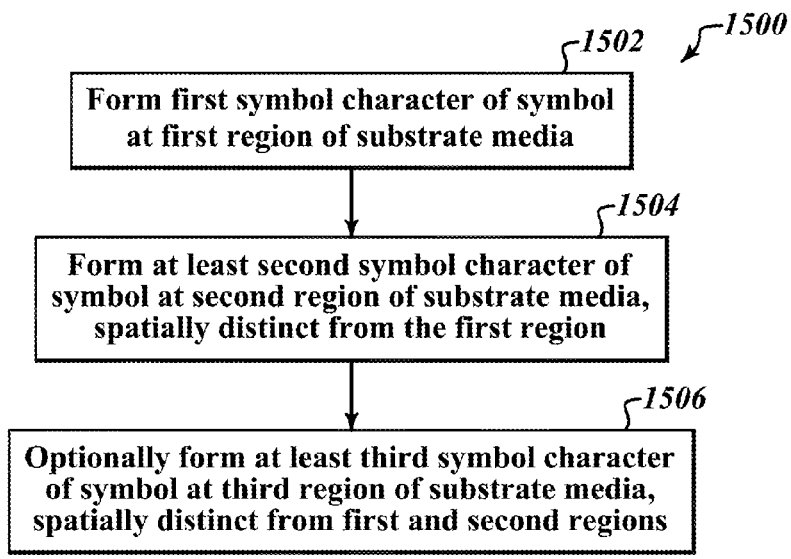
FIG. 15 is a flow diagram showing a high level method of operating a printer to form or apply marking media to substrate media to form one or more machine-readable indicia or symbols, according to one illustrated embodiment.

FIG. 15 shows a method 1500 of operating a printer to form or apply marking media to substrate media to form one or more machine-readable indicia or symbols, according to one illustrated embodiment.

At 1502, the printer or printhead forms a first symbol character of a symbol at a first region of a piece of substrate media, for example using a combination of marking media.

At 1504, the printer or printhead forms at least a second symbol character of the symbol at a second region of the piece of substrate media, for example using a combination of marking media. The second region is spatially distinct from the first region. The second symbol character at the second region is effectively humanly visually indiscernible in color from the first symbol character at the first region. Such renders it difficult for a person to even recognize that a machine-readable symbol is present.

Optionally at 1506, the printer or printhead forms at least a third symbol character of the symbol at a third region of the piece of substrate media, for example using a combination of marking media. The third region is spatially distinct from the first and the second regions. The third symbol character at the third region is effectively humanly visually indiscernible in color from the first and the second symbol characters at the first and the second regions, respectively.

As explained above, the marking media of each combination may be combined together before being deposited, ejected or otherwise applied to the substrate media. Such may include active mixing of the combined marking media to realize a more uniform distribution. Also as explained above, the marking media of each combination may be combined on the substrate media itself. For example, marking media may be successively applied to a portion or area of the substrate media, for instance before previous application of marking media dries.

The combination of marking material for the each symbol character is different than the combination for the other symbol characters where the information being represented by the respective symbol characters is different.

Figure 16:
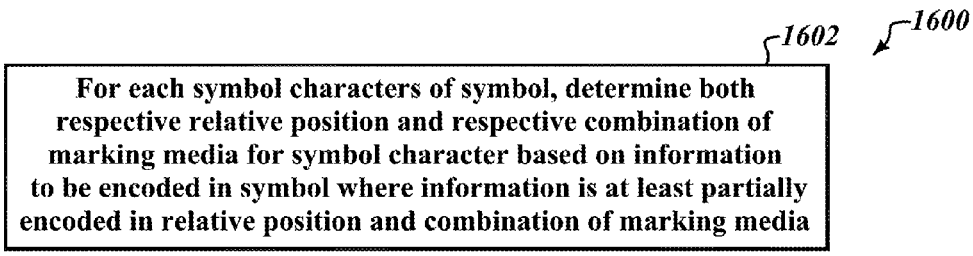
FIG. 16 is a flow diagram showing a method of operating a printer to form or apply marking media to substrate media to form one or more machine-readable indicia or symbols, according to one illustrated embodiment, useful in addition to the method of FIG. 15.

FIG. 16 shows a method 1600 of operating a printer to form or apply marking media to substrate media to form one or more machine-readable indicia or symbols, according to one illustrated embodiment. The method 16 may be performed in addition to the method 1500 (FIG. 15).

At 1602, for each of a plurality of symbol characters of the symbol, including the first and the second symbol characters, the printer or control subsystem thereof determines both a respective relative position and a respective combination of marking media for the symbol character based on the information to be encoded in the symbol. The information is at least partially encoded in the relative position and the combination of marking media of the symbol characters.

Figure 17:
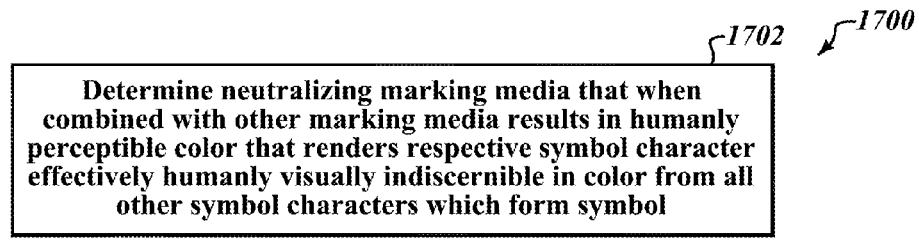
FIG. 17 is a flow diagram showing a method of operating a printer to form or apply marking media to substrate media to form one or more machine-readable indicia or symbols, according to one illustrated embodiment, useful as part of the method of FIG. 15.

FIG. 17 shows a method 1700 of operating a printer to form or apply marking media to substrate media to form one or more machine-readable indicia or symbols, according to one illustrated embodiment. The method 16 may be performed as part of the method 1500 (FIG. 15).

At 1702, the printer or control subsystem thereof determines a neutralizing marking media that when combined with other marking media will result in a humanly perceptible color that renders the respective symbol character effectively humanly visually indiscernible in color from all other symbol characters which form the symbol.

Figure 18:
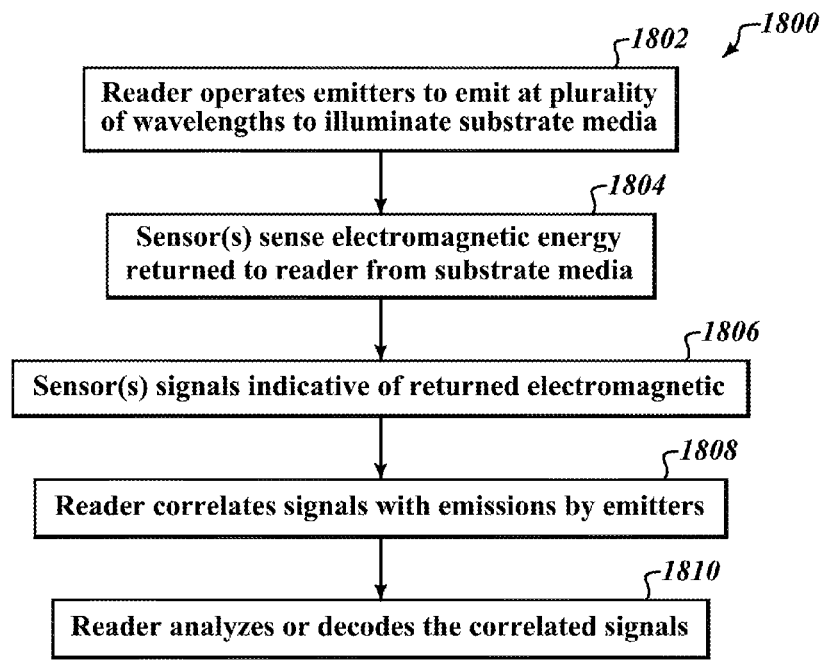
FIG. 18 is a flow diagram showing a high level method of operating a reader to read machine-readable indicia or symbols from pieces of media substrate, according to one illustrated embodiment.

FIG. 18 shows a method 1800 of operating a reader to read machine-readable indicia or symbols from pieces of media substrate, according to one illustrated embodiment.

At 1802, a control subsystem of a reader operates sources or emitters to emit electromagnetic energy for each of a plurality of wavelengths. The wavelengths may be across multiple bands or sub-bands of a portion of the electromagnetic spectrum, for example an optical portion which includes a visible portion (e.g., red through violet) and non-visible portion (e.g., infrared or near-infrared, ultraviolet or near-ultraviolet). For instance, the control subsystem may cause the sources or emitters to emit in three bands or sub-bands, red, green and blue. The emissions may be such that the individual colors projected on the substrate media are visually discernable or perceptible. Alternatively, the emissions may be such that individual colors projected on the substrate media are visually imperceptible as individual colors by the unaided human eye. For example, source or emitters may be operated in triplets, substantially concurrently emitting red, green and blue, to produce light that is perceived as white light by a human without the aid of an apparatus. In this respect, it is noted that wavelengths of electromagnetic radiation of approximately 650 nm (e.g., 620 nm-700 nm) are perceived as red, while wavelengths of approximately 475 nm (e.g., 450-475) are perceived as blue and wavelengths of approximately 510 nm (e.g., 495 nm-570 nm) are perceived as green. However, the combination of wavelengths from approximately 400 nm to approximately 700 nm is perceived by humans as white light.

The control subsystem may apply control signals to a power supply or emitter drive circuit which cause sources or emitters to emit electromagnetic radiation at one or more respective wavelengths. The control signals may take a variety of forms, for example digital or analog signals. The control signals may, for example, take the form of pulse width modulated signals. The control signals should be synchronized between the sets of sources or emitters to achieve the desired emission.

For example, a controller or control subsystem may drive the physical sources or emitters in a defined sequence with an electromagnetic forcing function. A physical source emits electromagnetic energy when driven by the electromagnetic forcing function. The control subsystem may drive the physical sources or emitters via the driver electronics. The driver electronics may include any combination of switches, transistors and multiplexers, as known by one of skill in the art or later developed, to drive the physical sources or emitters in a selected drive pattern. The electromagnetic forcing function may be a current, a voltage and/or duty cycle. For example, a forcing function may be a variable current that drives one or more of the physical sources or emitters in the selected drive pattern (also referred to as a selected sequence).

The control subsystem may, for instance, drive the physical sources or emitters, or any subset thereof, in the selected sequence, in which only one or zero physical sources are being driven at any given instant of time. Alternatively, the control subsystem may drive two or more physical sources at the same time for an overlapping time period during the selected sequence. The control subsystem may operate automatically, or may be responsive to input from a user. Use of the electromagnetic forcing function to drive the physical sources or emitters as a number of logical or virtual sources or emitters to increase the number of wavelengths and combinations thereof is discussed herein. On example of such is varying at least one of drive current level or temperature to realize emission at two or more defined wavelengths from a single physical source or emitter. For example, the control subsystem may cause defined first levels of a drive current to be supplied to the respective sources or emitters for a defined duration to operate the physical sources or emitters as first logical sources or emitters. Also for example, the control subsystem may cause defined second levels of a drive current to be supplied to the respective sources or emitters for a defined duration to operate the physical sources or emitters as second logical sources or emitters. The drive currents may compensate for temperature variation from a defined reference temperature. The compensation may further account for temperature induced wavelength of emission variation profile associated with the specific type of source or emitter. For example, the control subsystem may employ a mathematical relationship or a lookup table to adjust the drive currents based on a sensed temperature.

As noted above, sources or emitters such as LEDs typically have a nominal wavelength of emission which is commonly the center band of emission. For many types of LEDs the center band varies based on a number of parameters (e.g., drive current level or magnitude, temperature). Conventional drive circuits may, or may not, closely control drive current level. Conventional drive circuits may, or may not, compensate for temperature variation. When controlled, conventional drive circuits typically attempt to maintain a consistent center band of emission over time, and often attempt to maintain a consistent level of output (e.g., Lumens) over time. Thus, conventional drive circuits are typically configured to provide a consistent level of drive current over time, as may be adjusted to account for temperature variation.

The control subsystem described herein may be configured to intentionally vary the center band of emission of any one or more LEDs. Such may allow a single physical LED to act as two or more logical or virtual LEDs thereby producing a large variety of wavelengths than might otherwise be realized via a given number of LEDs.

Optionally, a variety of approaches may be employed to achieve emission of individual colors that are imperceptible as individual colors by the unaided human eye, if desired. For example, sources or emitters may be operated in combinations (e.g., triplets) where each member or each group of members of the combination emits in a respective band (e.g., red band, blue band, green band) of visible light to achieve a combined output which is perceived as either a single color or white light. For example, the control subsystem may operate the members of the combination to emit substantially concurrently so that electromagnetic radiation in the respective bands are emitted concurrently or overlapping. Alternatively, the control subsystem may operate the sources or emitters successively, at a frequency that is sufficiently high that the individual emissions are not perceived as respective colors.

At 1804, one or more sensors of the reader sense electromagnetic energy returned to the reader from the substrate media. The sensor(s) may be broadband sensors which are not capable of spectrally differentiating between various wavelengths of returned electromagnetic energy, however correlation with the wavelengths of emission allows spectral analysis to be performed. The marking media that forms the machine-readable indicia or symbol will cause the returned electromagnetic energy to have spectrally distinguishing characteristics, for example due to unique reflectance, absorption and florescence properties of the marking media. These spectrally distinguishing characteristics may from or constitute a spectral profile or signature.

A non-transitory processor- or computer-readable medium may store a logical relationship between a plurality of spectral profiles or signatures and logically associated human-comprehensible or readable symbols, characters or meanings. Where a single patch or dot of marking media is employed, there may be a one-to-one relationship between combinations of marking media and human-comprehensible or symbols, characters or meanings. Where multiple patches, cells or areas of marking media are employed, for example in the case of linear to two-dimensional machine-readable symbols, there may be a one-to-many relationship between combinations of marking media and human-comprehensible or symbols, characters or meanings, the meaning be resolved at least partially based on spatial relationship(s). For example, an edge-to-edge distance of between successive patches, cells or areas of marking media may be employed in encoding and decoding information in the symbology, analogous in some ways to conventional linear or two-dimensional symbologies. Advantageously, the use of combinations of marking media for each patch, cell or area provides a large increase in information density over such conventional linear or two-dimensional symbologies.

At 1806, one or more sensors of the reader produce signals indicative of electromagnetic energy received by sensor(s). The signals may, for example, be indicative a level or intensity of returned electromagnetic energy. The signals may be digital signals. ADCs may be employed where the sensors produce analog signals. The signals may be provided to the control subsystem of the reader for correlation, and optionally for analysis or decoding. The control subsystem performing the correlation is typically collocated with the sensor(s) and/or sources or emitters, although it may be remotely located therefrom. The control subsystem performing the analysis may be collocated with the sensor(s) and/or sources or emitters, or may be remotely located therefrom.

At 1808, the control subsystem of the reader correlates the signals from the sensor(s) with the emissions of electromagnetic energy produced by sources or emitters. There are a variety of approaches to correlating the signals indicative of the responses with the emissions, some of which have been described above. Typically, correlation will include a temporal correlation. That is, a signal indicative of a given response will be logically associated with one or more wavelengths of emission which produced the response based on timing. Such may be implemented by controlling the sources or emitters to provide a brief gap during which there is no emission between each successive emission. The gap should be sufficiently long as to ensure that the electromagnetic energy that is sensed by the sensor(s) is the result of a given emission rather than a previous emission or a subsequent emission by the sources or emitters. Since the control subsystem is controlling the sources or emitters to emit in a defined sequence of wavelengths, the control subsystem matches the signals indicative of each received response with the most immediately preceding wavelength(s) of emission. It is noted that in some instances, two or more distinct wavelengths may be emitted substantially concurrently from respective sources or emitters. In those situations the correlation simply reflects the relationship between the signal indicative of the received response and the two or more wavelengths. Combinations of emission at two or more center bands may increase the number of logical or virtual sources realizable by a given number of physical sources or emitters.

Correlation may also include correlation with a pattern modulated in the emissions. For example, a pattern may be modulated into the emissions by varying a parameter of emission, for instance a level or magnitude (e.g., lumens) of emission. The control subsystem may analyze the signals indicative of the returned responses for the modulated pattern. Such may advantageously be employed to discern sensed electromagnetic energy produced in response to the emissions by the sources or emitters (i.e., responses) from ambient background electromagnetic energy, thereby increasing a signal-to-noise ratio of the reader.

At 1810, the control subsystem of the reader analyzes or decodes the correlated signals from the sensor(s). For example, the control subsystem may compare the correlated signals, which may constitute a spectral signature or profile of produced by the marking media forming the machine-readable indicia or symbol, with a reference set of data or information which may constitute a spectral signature or profile of a reference machine-readable indicia, symbol, mark of marking media. The control system may decode the machine-readable indicia or symbol based on a defined symbology which maps at least the combinations of marking media to human-comprehensible or symbols, characters or meanings. As discussed above, the symbology may also encode information in various spatial relationships where a one- or two-dimensional machine-readable symbol is read.

The control subsystem may determine or employ a variety of thresholds in performing the analysis or decoding. The control subsystem may analyze or decode a variety of data, information, factors or parameters, and/or make a variety of determinations, comparisons and/or assessments based on a variety of data, information, factors or parameters in performing the analysis or decoding. For example, the control subsystem may employ various processing techniques on the correlated signals (e.g., spectral signature or profile) to identify matches, degree of matching to reference values, and/or to decode information encoded in the machine-readable indicia and symbols. The control subsystem may optionally determine a confidence level in a match or decoding of a machine-readable indicia and symbol. Such may, for example, be based on the number or percentage of wavelengths at which matches were found, the degree, level or extent of those matches (e.g., amount of similarity) and/or based on the particular threshold(s) employed in assessing those matches. A relatively high number of matches may increase the confidence level, while a relatively low number of matches may decrease the confidence level. A relatively high degree, level or extent of matching may increase the confidence level, while a relatively low degree, level or extent of matching may decrease the confidence level. Thresholds employed may serve as a proxy for degree, level or extent of matching. Various statistical techniques may be employed in assessing the degree, level or extent of matching and/or confidence level. The confidence level may be displayed to an end user and/or included in automatically generated reports.

The above description of illustrated embodiments, including what is described in the Abstract, is not intended to be exhaustive or to limit the embodiments to the precise forms disclosed. Although specific embodiments of and examples are described herein for illustrative purposes, various equivalent modifications can be made without departing from the spirit and scope of the disclosure, as will be recognized by those skilled in the relevant art. The teachings provided herein of the various embodiments can be applied to other spectral based data collection systems, not necessarily the exemplary multispectral data collection systems generally described above.

Various methods and/or algorithms have been described. Some or all of those methods and/or algorithms may omit some of the described acts or steps, include additional acts or steps, combine acts or steps, and/or may perform some acts or steps in a different order than described.

Correlation generally refers to correlating a response with a particular emission or excitation. For example, where operating sources or emitters emit a sequence of wavelengths, correlation may include associating or logically associating one or more responses with a particular wavelength which caused the response. Correlation may account for other factors or parameters, for instance a magnitude of the emission. Correlation may be achieved based on a temporal relationship that is a response measured or otherwise detected a defined time after a given emission is correlated or associated with that given emission. More sophisticated techniques may be employed. For example, a pattern may be modulated onto the emissions, for instance a varying magnitude or intensity of emission. Correlation may include identifying the pattern in the responses and associating the responses with respective emissions based on the pattern of modulation.

The foregoing detailed description has set forth various embodiments of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one embodiment, the present subject matter may be implemented via Application Specific Integrated Circuits (ASICs). However, those skilled in the art will recognize that the embodiments disclosed herein, in whole or in part, can be equivalently implemented in standard integrated circuits, as one or more computer programs running on one or more computers (e.g., as one or more programs running on one or more computer systems), as one or more programs running on one or more controllers (e.g., microcontrollers) as one or more programs running on one or more processors (e.g., microprocessors), as firmware, or as virtually any combination thereof, and that designing the circuitry and/or writing the code for the software and or firmware would be well within the skill of one of ordinary skill in the art in light of this disclosure.

In addition, those skilled in the art will appreciate that the mechanisms of taught herein are capable of being distributed as a program product in a variety of forms, and that an illustrative embodiment applies equally regardless of the particular type of nontransitory signal bearing media used to actually carry out the distribution. Examples of nontransitory signal bearing media include, but are not limited to, the following: recordable type media such as floppy disks, hard disk drives, CD ROMs, digital tape, and computer memory.

The various embodiments described above can be combined to provide further embodiments. All of the commonly assigned US patent application publications, US patent applications, foreign patents, foreign patent applications and non-patent publications referred to in this specification and/or listed in the Application Data Sheet, including but not limited to:

U.S. provisional patent application Ser. No. 61/597,593, filed Feb. 10, 2012; U.S. provisional patent application Ser. No. 60/820,938, filed Jul. 31, 2006; U.S. patent application Ser. No. 12/375,814, filed Jan. 30, 2009; U.S. provisional patent application Ser. No. 60/834,662, filed Jul. 31, 2006; U.S. patent application Ser. No. 11/831,662, filed Jul. 31, 2007; U.S. Provisional Patent Application No. 60/890,446, filed Feb. 16, 2007; U.S. Provisional Patent Application No. 60/883,312, filed Jan. 3, 2007; U.S. Provisional Patent Application No. 60/871,639, filed Dec. 22, 2006; and U.S. Provisional Patent Application No. 60/834,589, filed Jul. 31, 2006; U.S. patent application Ser. No. 11/831,717, filed Jul. 31, 2007; and U.S. provisional patent application Ser. No. 61/538,617, filed Sep. 23, 2011 are incorporated herein by reference, in their entirety. Aspects of the embodiments can be modified, if necessary, to employ systems, circuits and concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A printer, comprising:
a number of media receptacles to respectively receive respective ones of a number of consumable marking media, each of the marking media having at least one respective spectral distinguishing characteristic, the at least one spectral distinguishing characteristic of each one of the marking media different from the at least one spectral distinguishing characteristic of the other ones of the marking media;
at least one printhead operable to selectively form one or more marks with the marking media on a substrate media; and a control subsystem which, for each of a number of pieces of information, selects from the number of marking media available in the printer based on the respective piece of information to be represented and controls the at least one printhead to form the marks on the substrate media with the marking media selected for the respective one of the pieces of information, at least one of the marks including a combination of at least two of the marking media which are not spatially separably distinguishable from one another by an unaided human.

2. The printer of claim 1, further comprising:
at least one combining chamber in which the selected marking media are combined before forming the marks on the substrate media.

3. The printer of claim 1 wherein the control subsystem controls the printhead to apply a first one of the selected marking media to a first area of the substrate media, and subsequently apply a second one of the selected marking media to the first area of the substrate media.

4. The printer of claim 1 wherein the printer is an ink jet printer and the marking media includes a plurality of inks or is a laser printer and the marking media includes a plurality of toners.

5. The printer of claim 1 wherein the control subsystem further, for each of at least some of the number of pieces of information to be represented on one or more substrate media, selects from the number of consumable marking media available in the printer at least one additional marking media that in combination with the other selected marking media masks the marks.

6. The printer of claim 1 wherein the control subsystem further, for each of at least some of the number of pieces of information to be represented on one or more substrate media, selects from the number of consumable marking media available in the printer at least one additional marking media that in combination with the other selected marking media for the respective mark renders the respective mark effectively not visually humanly discernable from other ones of the marks by an unaided human observer.

7. The printer of claim 1, further comprising:
a transport mechanism communicatively coupled to the control subsystem to be controlled thereby and operable to transport the substrate medium relative to the printhead.

8. The printer of claim 7 wherein the transport mechanism is one of a sheet feed transport mechanism including at least one roller and at least one motor coupled to drive the at least one roller and operable to transport sheets of substrate medium past the printhead or a continuous web transport mechanism including at least one roller and at least one motor coupled to drive the continuous web of substrate medium past the printhead.

9. A method of operating a printer, comprising:
for each of a number of pieces of information to be represented on one or more substrate media, selecting from a number of consumable marking media available in the printer based on the respective piece of information to be represented, each of the marking media having at least one respective spectral distinguishing characteristic, the at least one spectral distinguishing characteristic of each one of the marking media different from the at least one spectral distinguishing characteristic of the other ones of the marking media; and
for each of a number of pieces of information to be represented on one or more substrate media, forming a mark on the substrate media with the marking media selected for the respective one of the pieces of information, at least one of the marks including a combination of at least two of the marking media which are not spatially separably distinguishable from one another by an unaided human.

10. The method of claim 9, further comprising:
combining the selected marking media before forming the mark on the substrate media.

11. The method of claim 9 wherein forming a mark on the substrate media with the marking media selected for the respective one of the pieces of information includes applying a first one of the selected marking media to a first area of the substrate media, and subsequently applying a second one of the selected marking media to the first area of the substrate media.

12. The method of claim 9 wherein forming the mark on the substrate media includes at least one of ejecting or depositing the selected marking media on the substrate media.

13. The method of claim 9 wherein the number of marking media takes the form of a plurality of ink or a plurality of toners, and forming the mark on the substrate media includes applying to the substrate media the inks or the toners that correspond to the selected marking media.

14. The method of claim 9, further comprising:
for each of at least some of the number of pieces of information to be represented on one or more substrate media, selecting from the number of consumable marking media available in the printer at least one additional marking media that in combination with the other selected marking media masks the mark.

15. The method of claim 9, further comprising:
for each of at least some of the number of pieces of information to be represented on one or more substrate media, selecting from the number of consumable marking media available in the printer at least one additional marking media that in combination with the other selected marking media for the respective mark renders the respective mark effectively not visually discernable from other ones of the marks by an unaided human observer.

16. A printer, comprising:
a number of media receptacles to respectively receive respective ones of a number of consumable marking media, each of the marking media having at least one respective spectral distinguishing characteristic, the at least one spectral distinguishing characteristic of each one of the marking media different from the at least one spectral distinguishing characteristic of the other ones of the marking media;
at least one combining chamber in which the selected marking media are combined;
at least one printhead operable to selectively form one or more marks with the combined marking media on a substrate media; and
a control subsystem which, for each of a number of pieces of information, selects from the number of marking media available in the printer based on the respective piece of information to be represented and controls the at least one printhead to form the marks on the substrate media with the combined marking media selected for the respective one of the pieces of information, at least one of the marks including a combination of at least two of the marking media which are not spatially separably distinguishable from one another by an unaided human.

17. The printer of claim 16 wherein a first number of the marking media are combined for a first one of the pieces of information, and a second number of the marking media are combined for a second one of the pieces of information, the second number different than the first number.

18. The printer of claim 16 wherein for each of at least some of the number of pieces of information to be represented on one or more substrate media, the control subsystem further selects from the number of consumable marking media available in the printer at least one additional marking media that in combination with the other selected marking media masks the mark.

19. The printer of claim 16 wherein for each of at least some of the number of pieces of information to be represented on one or more substrate media, the control subsystem further selects from the number of consumable marking media available in the printer at least one additional marking media that in combination with the other selected marking media for the respective mark renders the respective mark effectively not visually discernable from other ones of the marks by an unaided human observer.

20. A method of operating a printer, comprising:
for each of a number of pieces of information to be represented on one or more substrate media, selecting from a number of consumable marking media available in the printer based on the respective piece of information to be represented, each of the marking media having at least one respective spectral distinguishing characteristic, the at least one spectral distinguishing characteristic of each one of the marking media different from the at least one spectral distinguishing characteristic of the other ones of the marking media;
for at least one of the pieces of information, combining a combination of at least two of the marking media selected for the respective one of the pieces of information; and
for each of a number of pieces of information to be represented on one or more substrate media, forming a mark on the substrate media with the marking media selected for the respective one of the pieces of information.

21. The method of claim 20 wherein mixing a combination of at least two of the marking media selected for the respective one of the pieces of information includes combining a combination of two of the marking media for a first one of the pieces of information, and combining a combination of five of the marking media for a second one of the pieces of information.

22. The method of claim 20, further comprising:
for each of at least some of the number of pieces of information to be represented on one or more substrate media, selecting from the number of consumable marking media available in the printer at least one additional marking media that in combination with the other selected marking media masks the mark.

23. The method of claim 20, further comprising:
for each of at least some of the number of pieces of information to be represented on one or more substrate media, selecting from the number of consumable marking media available in the printer at least one additional marking media that in combination with the other selected marking media for the respective mark renders the respective mark effectively not visually discernable from other ones of the marks by an unaided human observer.

24. A printer, comprising:
a number of media receptacles to respectively receive respective ones of a number of consumable marking media, each of the marking media having at least one respective spectral distinguishing characteristic, the at least one spectral distinguishing characteristic of each one of the marking media different from the at least one spectral distinguishing characteristic of the other ones of the marking media;
at least one printhead operable to selectively form one or more marks with the marking media on a substrate media; and
a control subsystem which, for each of a number of pieces of information to be represented on one or more substrate media, selects from the consumable marking media available in the printer based on the respective piece of information to be represented, and selects from the number of consumable marking media available in the printer at least one additional marking media that in combination with the other selected marking media for the respective mark renders the respective mark effectively not visually discernable from other ones of the marks by an unaided human observer.

25. The printer of claim 24, further comprising:
a combining chamber in which the marking media selected for the respective one of the pieces of information and the additional marking media selected for the respective one of the pieces of information are combined; and
wherein, for each of the number of pieces of information to be represented on one or more substrate media, the control subsystem controls the at least one printhead to form a respective mark on the substrate media with the combination of marking media and additional marking media selected for the respective one of the pieces of information.

26. The printer of claim 24 wherein combining the marking media selected for the respective one of the pieces of information and the additional marking media includes combining at least two of the marking media selected for a first one of the pieces of information and at least one of the additional marking media selected for the respective first one of the pieces of information.

27. The printer of claim 24 wherein selecting from the number of consumable marking media available in the printer at least one additional marking media includes selecting the additional marking media to produce a respective combination of marking media that results in markings which are effectively humanly visually indiscernible in color for each different piece of information.

28. The printer of claim 24 wherein selecting from the number of consumable marking media available in the printer at least one additional marking media includes selecting the additional marking media to produce a respective combination of marking media that results in markings which are gray in color for each different piece of information.

29. A method of operating a printer, comprising:
for each of a number of pieces of information to be represented on one or more substrate media, selecting from a number of consumable marking media available in the printer based on the respective piece of information to be represented, each of the marking media having at least one respective spectral distinguishing characteristic, the at least one spectral distinguishing characteristic of each one of the marking media different from the at least one spectral distinguishing characteristic of the other ones of the marking media;
for each of at least some of the number of pieces of information to be represented on one or more substrate media, selecting from the number of consumable marking media available in the printer at least one additional marking media that in combination with the other selected marking media for the respective mark renders the respective mark effectively not visually discernable from other ones of the marks by an unaided human observer.

30. The method of claim 29, further comprising:
combining the marking media selected for the respective one of the pieces of information and the additional marking media selected for the respective one of the pieces of information; and
for each of a number of pieces of information to be represented on one or more substrate media, forming a mark on the substrate media with the combination of marking media selected for the respective one of the pieces of information.

31. The method of claim 29 wherein combining the marking media selected for the respective one of the pieces of information and the additional marking media includes combining at least two of the marking media selected for a first one of the pieces of information and at least one of the additional marking media selected for the respective first one of the pieces of information.

32. The method of claim 29 wherein the control subsystem selects the additional marking media to produce a respective combination of marking media that results in markings which are effectively humanly visually indiscernible in color for each different piece of information.

33. The method of claim 29 wherein the control subsystem selects the additional marking media to produce a respective combination of marking media that results in markings which are gray in color for each different piece of information.

34. A printer, comprising:
at least one printhead operable to selectively form one or more marks with the marking media on a substrate media; and
a control subsystem which causes the at least one printhead to form a first symbol character of a symbol at a first region of a piece of substrate media; and at least a second symbol character of the symbol at a second region of the piece of substrate media, the second region spatially distinct from the first region, wherein the second symbol character at the second region is effectively humanly visually indiscernible in color from the first symbol character at the first region.

35. The printer of claim 34 wherein the control subsystem further causes the at least one printhead to form at least a third symbol character of the symbol at a third region of the piece of substrate media, the third region spatially distinct from the first and the second regions, wherein the third symbol character at the third region is effectively humanly visually indiscernible in color from the first and the second symbol characters at the first and the second regions, respectively.

36. The printer of claim 34, further comprising:
a number of reservoirs of marking media available to the at least one printhead, each of the marking media having at least one respective spectral distinguishing characteristic, the at least one spectral distinguishing characteristic of each one of the marking media different from the at least one spectral distinguishing characteristic of the other ones of the marking media.

37. The printer of claim 36 wherein the control subsystem causes the at least one printhead to form the first symbol character of the symbol from a first combination of at least two of a plurality of marking media based on the information to be represented; and form the second symbol character of the symbol from a second combination of at least two of a plurality of marking media based on the information to be represented, the second combination different from the first combination.

38. The printer of claim 36, further comprising:
at least one combining chamber in which the selected marking media are combined before forming the marks on the substrate media.

39. The printer of claim 36 wherein the control subsystem causes the at least one printhead to apply a first one of the marking media of the first combination to a first region of the substrate media, and subsequently apply a second one of the marking media of the first combination to the first region of the substrate media to form the first symbol character on the substrate media.

40. The printer of claim 34 wherein for each of a plurality of symbol characters of the symbol, including the first and the second symbol characters, the control subsystem determines both a respective relative position and a respective combination of marking media for the symbol character based on the information to be encoded in the symbol where information is at least partially encoded in the relative position and the combination of marking media of the symbol characters.

41. The printer of claim 34 wherein for each of a plurality of symbol characters of the symbol, including the first and the second symbol characters, the control subsystem determines a neutralizing marking media that when combined with other marking media will result in a humanly perceptible color that renders the respective symbol character effectively humanly visually indiscernible in color from all other symbol characters which form the symbol.

42. The printer of claim 34 wherein the printer is an ink jet printer and the marking media includes a plurality of inks or the printer is a laser printer and the marking media includes a plurality of toners.

43. A method of operating a printer to form symbols which encode information, comprising:
forming a first symbol character of a symbol at a first region of a piece of substrate media; and
forming at least a second symbol character of the symbol at a second region of the piece of substrate media, the second region spatially distinct from the first region, wherein the second symbol character at the second region is effectively humanly visually indiscernible in color from the first symbol character at the first region.

44. The method of claim 43, further comprising:
forming at least a third symbol character of the symbol at a third region of the piece of substrate media, the third region spatially distinct from the first and the second regions, wherein the third symbol character at the third region is effectively humanly visually indiscernible in color from the first and the second symbol characters at the first and the second regions, respectively.

45. The method of claim 43 wherein forming a first symbol character includes forming the first symbol character of the symbol from a first combination of at least two of a plurality of marking media available in the printer based on the information to be represented, each of the marking media having at least one respective spectral distinguishing characteristic, the at least one spectral distinguishing characteristic of each one of the marking media different from the at least one spectral distinguishing characteristic of the other ones of the marking media; and wherein forming a second symbol character includes forming the second symbol character of the symbol from a second combination of at least two of a plurality of marking media available in the printer based on the information to be represented, the second combination different from the first combination.

46. The method of claim 45 wherein forming the first and the second symbol characters on the substrate media includes at least one of ejecting or depositing the respective combination of marking media on the substrate media.

47. The method of claim 45, further comprising:
mixing the marking media of the first combination before forming the first symbol character on the substrate media.

48. The method of claim 45 wherein forming a first symbol character on the substrate media with the first combination of marking media includes applying a first one of the marking media of the first combination to a first region of the substrate media, and subsequently applying a second one of the marking media of the first combination to the first region of the substrate media.

49. The method of claim 45, further comprising:
for each of a plurality of symbol characters of the symbol, including the first and the second symbol characters, determining both a respective relative position and a respective combination of marking media for the symbol character based on the information to be encoded in the symbol where information is at least partially encoded in the relative position and the combination of marking media of the symbol characters.

50. The method of claim 45 wherein determining a respective combination of marking media for the symbol character based on the information to be encoded in the symbol includes determining a neutralizing marking media that when combined with other marking media will result in a humanly perceptible color that renders the respective symbol character effectively humanly visually indiscernible in color from all other symbol characters which form the symbol.

\* \* \* \* \*